United States Patent
Goto et al.

(10) Patent No.: US 10,946,684 B2
(45) Date of Patent: Mar. 16, 2021

(54) PRINTED MATERIAL, IMAGE RECORDING METHOD, AND IMAGE RECORDING APPARATUS

(71) Applicant: CANON KABUSHIKI KAISHA, Tokyo (JP)

(72) Inventors: Ryohei Goto, Fujisawa (JP); Fumihiro Goto, Kawasaki (JP); Yohei Iwasaki, Tokyo (JP); Tomoko Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/204,027

(22) Filed: Nov. 29, 2018

(65) Prior Publication Data

US 2019/0094422 A1 Mar. 28, 2019

Related U.S. Application Data

(63) Continuation of application No. PCT/JP2017/019914, filed on May 29, 2017.

(30) Foreign Application Priority Data

May 30, 2016 (JP) .............................. JP2016-107905
May 30, 2016 (JP) .............................. JP2016-107907
(Continued)

(51) Int. Cl.
*B41J 2/005* (2006.01)
*B41M 7/00* (2006.01)
(Continued)

(52) U.S. Cl.
CPC .......... *B41M 7/0018* (2013.01); *B41J 2/0057* (2013.01); *B41J 2/17* (2013.01);
(Continued)

(58) Field of Classification Search
CPC .............. B41J 2/0057; B41J 2002/012; B41M 7/0018; C09D 11/023; C09D 11/322; C09D 11/54
See application file for complete search history.

(56) References Cited

U.S. PATENT DOCUMENTS

2016/0159035 A1* 6/2016 Ono ........................ B41M 5/42
428/41.7

FOREIGN PATENT DOCUMENTS

| CN | 1212211 A | 3/1999 |
|---|---|---|
| CN | 103568617 A | 2/2014 |

(Continued)

*Primary Examiner* — Matthew Luu
*Assistant Examiner* — Kendrick X Liu
(74) *Attorney, Agent, or Firm* — Canon U.S.A. Inc., IP Division

(57) ABSTRACT

A printed material of the present invention is a printed material including a recording medium, a color material layer, and a fine irregular layer functioning as an outermost layer in this order; the color material layer contains a pigment; the fine irregular layer contains spherical particles having a specific average particle diameter; the spherical particles are present in a thickness direction of the fine irregular layer; and the surface of the fine irregular layer has convex portions having an average height of 0.04 to 0.15 μm and an image definition C(2) is 50% or more.

33 Claims, 12 Drawing Sheets

(30) Foreign Application Priority Data

May 30, 2016 (JP) ............................. JP2016-107908
May 30, 2016 (JP) ............................. JP2016-107909

(51) Int. Cl.
    *C09D 11/023*     (2014.01)
    *C09D 11/322*     (2014.01)
    *C09D 11/54*     (2014.01)
    *G02B 1/111*     (2015.01)
    *B41M 5/00*     (2006.01)
    *G02B 1/118*     (2015.01)
    *B41J 2/17*     (2006.01)
    *B41J 2/21*     (2006.01)
    *B41J 2/01*     (2006.01)

(52) U.S. Cl.
    CPC ............. *B41J 2/21* (2013.01); *B41M 5/0017* (2013.01); *C09D 11/023* (2013.01); *C09D 11/322* (2013.01); *C09D 11/54* (2013.01); *G02B 1/111* (2013.01); *G02B 1/118* (2013.01); *B41J 2002/012* (2013.01)

(56) References Cited

FOREIGN PATENT DOCUMENTS

| | | |
|---|---|---|
| JP | 2003-266662 A | 9/2003 |
| JP | 2004-263049 A | 9/2004 |
| JP | 2007-76033 A | 3/2007 |
| JP | 2007-175916 A | 7/2007 |
| JP | 2009-160867 A | 7/2009 |
| JP | 2011-26553 A | 2/2011 |
| JP | 2012152987 A * | 8/2012 |
| JP | 2012-171185 A | 9/2012 |
| JP | 2012-224739 A | 11/2012 |
| JP | 2013-000979 A | 1/2013 |
| JP | 2013-103357 A | 5/2013 |
| JP | 2014-43559 A | 3/2014 |
| JP | 5673138 B2 | 2/2015 |
| JP | 2015-221560 A | 12/2015 |

* cited by examiner

PRINTED MATERIAL, IMAGE RECORDING METHOD, AND IMAGE RECORDING APPARATUS

CROSS-REFERENCE TO RELATED APPLICATIONS

This application is a Continuation of International Patent Application No. PCT/JP2017/019914, filed May 29, 2017, which claims the benefit of Japanese Patent Application No. 2016-107905, filed May 30, 2016, No. 2016-107907, filed May 30, 2016, No. 2016-107908, filed May 30, 2016, and No. 2016-107909, filed May 30, 2016, which are hereby incorporated by reference herein in their entirety.

TECHNICAL FIELD

The present invention relates to a printed material, an image recording method, and an image recording apparatus.

BACKGROUND ART

In a printed material formed using a pigment ink, since the pigment is liable to remain on a surface of a recording medium, although a highly fine and clear image quality can be obtained, the visibility may be degraded in some cases. In order to obtain a printed material having a high visibility, reflection which occurs when light is irradiated on a printed surface is required to be suppressed, and the printed material is required to be prevented from being observed whiter than an actual image. In addition, in order to obtain a printed material having an excellent durability, abrasion resistance is also required so as to prevent the change in gloss due to, for example, bleeding of the printed material by rubbing with a hand finger and/or a fluorescent pen.

As a means to solve the problem described above, a method using a principle of a moth-eye structure may be mentioned. In particular, there has been disclosed a method (PTL 1) in which a metal substrate having a surface provided with a plurality of fine holes which are formed at a cycle equivalent to or smaller than a wavelength in a visible light region is brought into contact with a surface of a printed material with pressure to form a plurality of convex portions on the surface of the printed material at a cycle equivalent to or smaller than the wavelength in the visible light region.

CITATION LIST

Patent Literature

PTL 1: Japanese Patent No. 5,673,138

SUMMARY OF INVENTION

According to the method disclosed in PTL 1, since the convex portions required for reflection suppression each have a long and thin shape, there has been a problem in that this shape is liable to collapse by an external force, such as abrasion. In addition, since a portion at which the convex portion shape is lost has a gloss different from that of the other portions and is also observed as a scratch and/or an uneven spot, the image quality may be degraded in some cases.

Hence, the present invention was made in consideration of the problem of the above related technique and aims to provide a printed material having a high visibility, the visibility of which is not likely to be degraded even if an external force is applied, an image recording method, and an image recording apparatus.

A printed material according to the present invention is a printed material comprising: a recording medium; a color material layer; and a fine irregular layer functioning as an outermost layer in this order, the color material layer contains a pigment, the fine irregular layer contains spherical particles having an average particle diameter of 110 to 400 nm, the spherical particles are present in a thickness direction of the fine irregular layer, a surface of the fine irregular layer has convex portions having an average height of 0.04 to 0.15 µm, and an image definition C(2) at an optical comb width of 2 mm is 50% or more.

In addition, an image recording method according to the present invention comprises: a step of applying a reaction liquid on a recording medium; a step of applying an ink containing a pigment on the recording medium; a step of applying an auxiliary liquid containing spherical particles having an average particle diameter of 110 to 400 nm to the reaction liquid and the ink on the recording medium, and a step of forming an image having a fine irregular layer as an outermost layer by treating a surface of a region to which the auxiliary liquid is applied so as to have convex portions having an average height of 0.04 to 0.15 µm and an image definition C(2) of the image of 50% or more at an optical comb width of 2 mm.

In addition, another image recording method according to the present invention comprises: a step of applying a reaction liquid on a transfer member; a step of applying an auxiliary liquid containing spherical particles having an average particle diameter of 110 to 400 nm to the reaction liquid on the transfer member; a step of forming an intermediate image by applying an ink containing a pigment to the reaction liquid and the auxiliary liquid on the transfer member; a transfer step of transferring the intermediate image on the transfer member to a recording medium by bringing the intermediate image on the transfer member into contact with the recording medium; and a step of forming an image having a fine irregular layer as an outermost layer by treating a surface of a region to which the auxiliary liquid is applied of the intermediate image on the recording medium obtained after the transfer step so as to have convex portions having an average height of 0.04 to 0.15 µm and an image definition C(2) of the image of 50% or more at an optical comb width of 2 mm.

In addition, another image recording method according to the present invention comprises: a step of applying a reaction liquid on a transfer member; a step of forming an intermediate image by applying an ink containing a pigment to the reaction liquid on the transfer member; a transfer step of transferring the intermediate image on the transfer member to a recording medium by bringing the intermediate image on the transfer member into contact with the recording medium; a step of applying an auxiliary liquid containing spherical particles having an average particle diameter of 110 to 400 nm to the intermediate image on the recording medium obtained after the transfer step; and a step of forming an image having a fine irregular layer as an outermost layer by treating a surface of a region to which the auxiliary liquid is applied so as to have convex portions having an average height of 0.04 to 0.15 µm and an image definition C(2) of the image of 50% or more at an optical comb width of 2 mm.

In addition, another image recording method according to the present invention comprises: a step of applying a reaction liquid on a transfer member; a step of applying a first auxiliary liquid containing spherical particles having an average particle diameter of 110 to 400 nm to the reaction liquid on the transfer member; a step of applying an ink containing a pigment to the reaction liquid and the first auxiliary liquid on the transfer member; a step of forming an intermediate image by applying a second auxiliary liquid containing a water-soluble resin reactable with the reaction liquid to the reaction liquid, the first auxiliary liquid, and the ink on the transfer member; a transfer step of transferring the intermediate image on the transfer member to a recording medium by bringing the intermediate image on the transfer member into contact with the recording medium; and a step of forming an image having a fine irregular layer as an outermost layer by treating a surface of a region to which the first auxiliary liquid is applied of the intermediate image on the recording medium obtained after the transfer step so as to have convex portions having an average height of 0.04 to 0.15 μm and an image definition C(2) of the image of 50% or more at an optical comb width of 2 mm, and in this image recording method, a temperature (Tc) of the intermediate image to be brought into contact with the recording medium is a temperature equivalent to or more than the glass transition temperature of the water-soluble resin contained in the second auxiliary liquid, and a temperature (Tr) of the intermediate image is a temperature less than the glass transition temperature of the water-soluble resin contained in the second auxiliary liquid.

Furthermore, an image recording apparatus according to the present invention comprises: a reaction liquid application means for applying a reaction liquid on a recording medium; an ink application means for applying an ink containing a pigment to the reaction liquid on the recording medium; an auxiliary liquid application means for applying an auxiliary liquid containing spherical particles having an average particle diameter of 110 to 400 nm to the reaction liquid and the ink on the recording medium; and a fine irregular layer forming means for forming an image having a fine irregular layer as an outermost layer by treating a surface of a region to which the auxiliary liquid is applied so as to have convex portions having an average height of 0.04 to 0.15 μm and an image definition C(2) of the image of 50% or more at an optical comb width of 2 mm.

Furthermore, another image recording apparatus according to the present invention comprises: a reaction liquid application means for applying a reaction liquid on a transfer member; an auxiliary liquid application means for applying an auxiliary liquid containing spherical particles having an average particle diameter of 110 to 400 nm to the reaction liquid on the transfer member; an ink application means for applying an ink containing a pigment to the reaction liquid and the auxiliary liquid on the transfer member to form an intermediate image; a transfer means for transferring the intermediate image on the transfer member to a recording medium by bringing the intermediate image on the transfer member into contact with the recording medium; and a fine irregular layer forming means for forming an image having a fine irregular layer as an outermost layer by treating a surface of a region to which the auxiliary liquid is applied of the intermediate image on the recording medium obtained by the transfer means so as to have convex portions having an average height of 0.04 to 0.15 μm and an image definition C(2) of the image of 50% or more at an optical comb width of 2 mm.

Furthermore, another image recording apparatus according to the present invention comprises: a reaction liquid application means for applying a reaction liquid on a transfer member; a first auxiliary liquid application means for applying a first auxiliary liquid containing spherical particles having an average particle diameter of 110 to 400 nm to the reaction liquid on the transfer member; an ink application means for applying an ink to the reaction liquid and the first auxiliary liquid on the transfer member; a second auxiliary liquid application means for applying a second auxiliary liquid containing a water-soluble resin reactable with the reaction liquid to the reaction liquid, the first auxiliary liquid, and the ink on the transfer member; a transfer means for transferring an intermediate image on the transfer member to a recording medium by bringing the intermediate image on the transfer member into contact with the recording medium; a fine irregular layer forming means for forming an image having a fine irregular layer as an outermost layer by treating a surface of a region to which the first auxiliary liquid is applied of the intermediate image on the recording medium obtained by the transfer means so as to have convex portions having an average height of 0.04 to 0.15 μm and an image definition C(2) of the image of 50% or more at an optical comb width of 2 mm; and a temperature adjustment means for adjusting the temperature of the intermediate image so that a temperature (Tc) of the intermediate image to be brought into contact with the recording medium is set to a temperature equivalent to or more than the glass transition temperature of the water-soluble resin, and a temperature (Tr) of the intermediate image to be peeled away from the transfer member is set to a temperature less than the glass transition temperature of the water-soluble resin.

According to the present invention, a printed material having a high visibility, the visibility of which is not likely to be degraded even if an external force is applied, an image recording method, and an image recording apparatus can be obtained.

Further features of the present invention will become apparent from the following description of exemplary embodiments with reference to the attached drawings.

DESCRIPTION OF EMBODIMENTS

Figure 1:
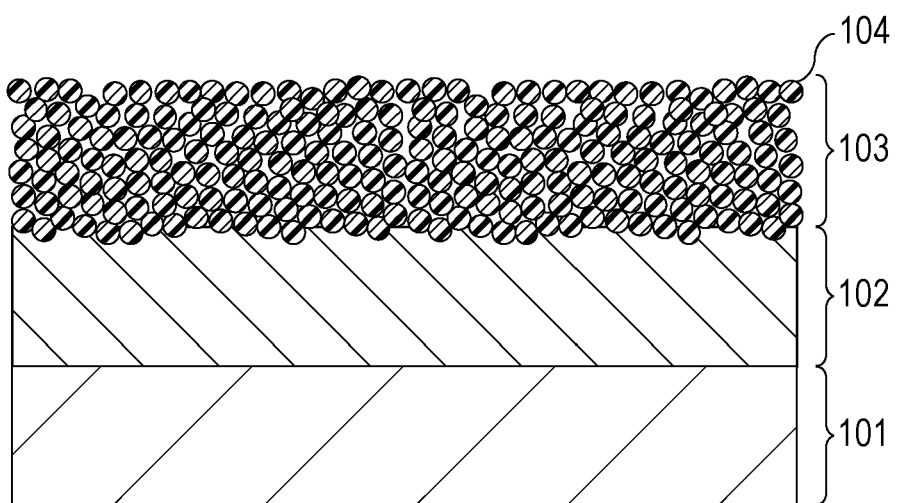
FIG. 1 is a cross-sectional view of one example of a printed material according to the present invention.
Figure 2:
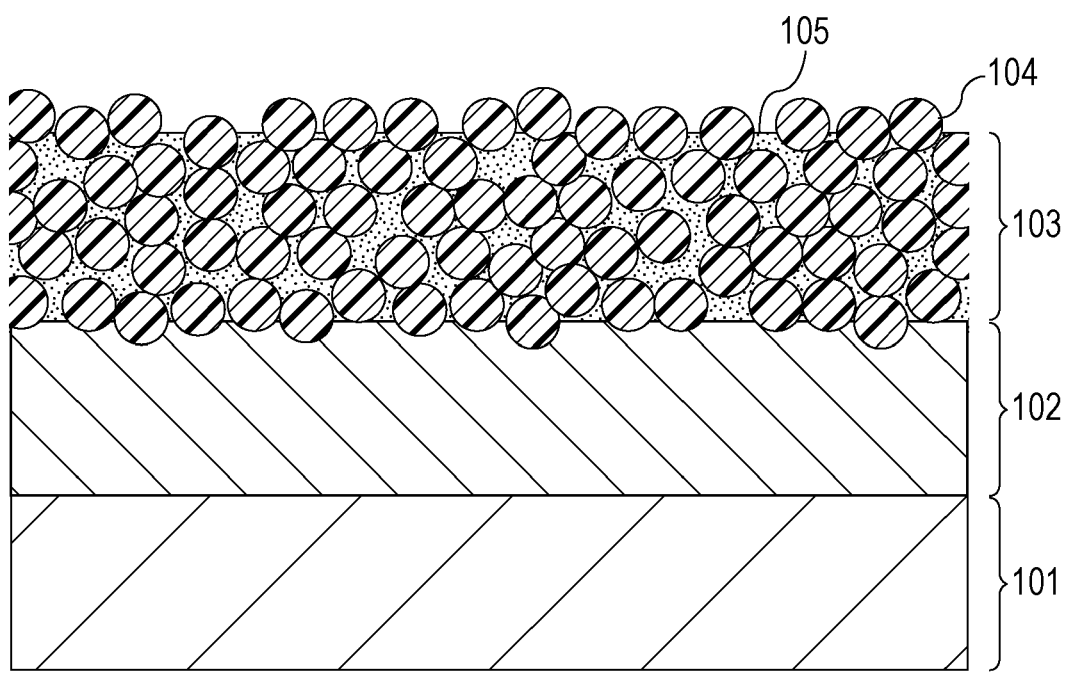
FIG. 2 is a cross-sectional view of one example of the printed material according to the present invention.
Figure 3:
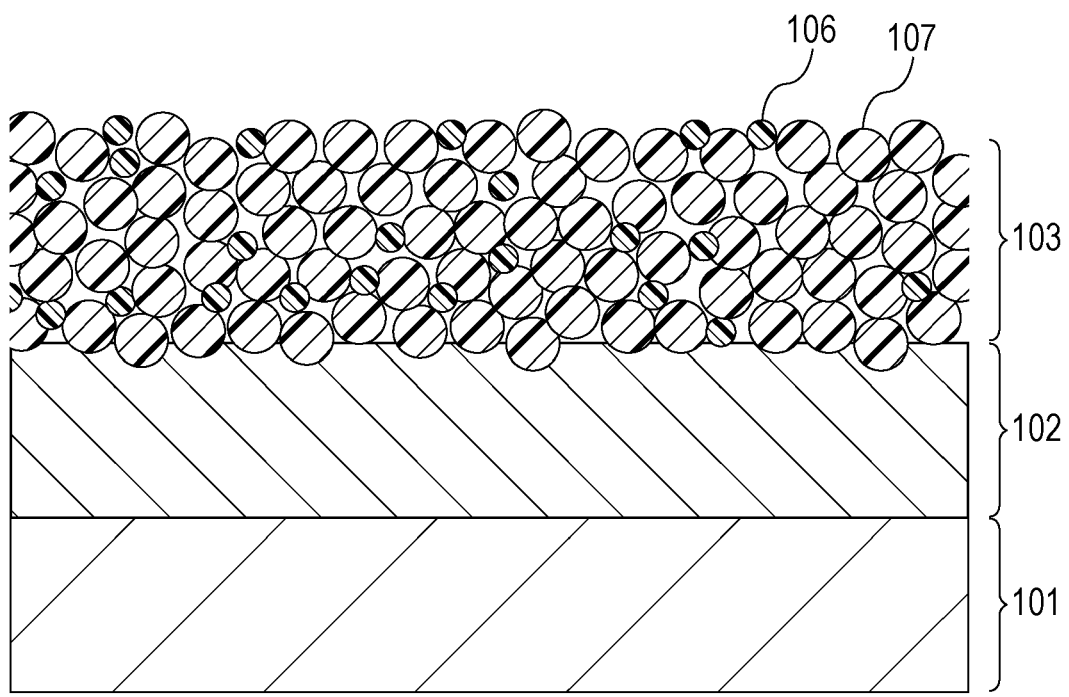
FIG. 3 is a cross-sectional view of one example of the printed material according to the present invention.
Figure 4:
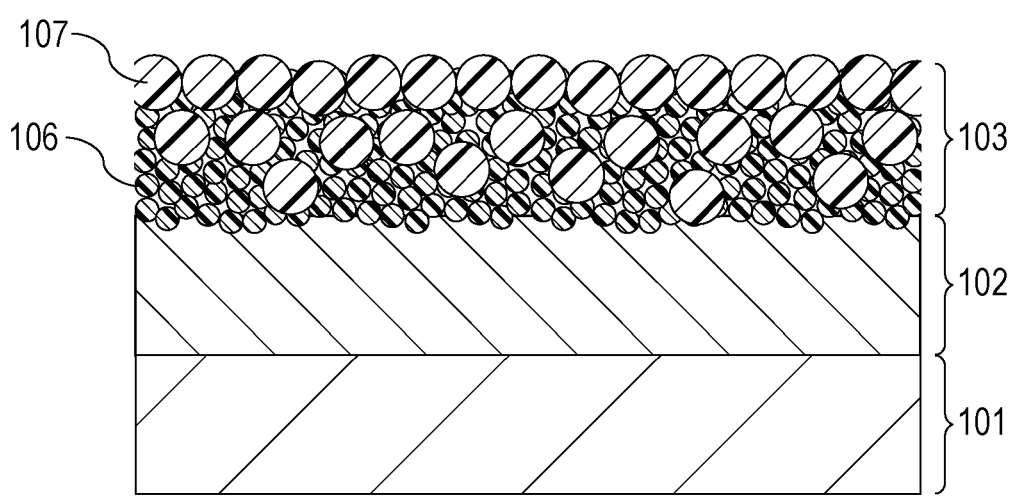
FIG. 4 is a cross-sectional view of one example of the printed material according to the present invention.

Hereinafter, with reference to preferable embodiments, the present invention will be described in detail.

1. Printed Material

A printed material according to the present invention includes a recording medium, a color material layer, and a fine irregular layer functioning as an outermost layer in this order. The color material layer contains a pigment. The fine irregular layer contains spherical particles having an average particle diameter of 110 to 400 nm, and the spherical particles are present in a thickness direction of the fine irregular layer. A surface of the fine irregular layer has convex portions having an average height of 0.04 to 0.15 μm, and an image definition C(2) at an optical comb width of 2 mm is 50% or more.

According to the investigation carried out by the present inventors, in general, an image having a high image clarity at an image definition C(2) of 50% or more is liable to have a high light reflection. That is, it was found that when the image clarity of an image of a printed material is improved, light reflection is also enhanced, and as a result, the visibility is degraded. Furthermore, it was also found that when a color material layer contains a pigment as a color material, since the pigment is liable to remain on a surface of a recording medium as compared to a dye, the image is liable to be influenced by light reflection. Accordingly, research was carried out by the present inventors to provide a printed material which suppresses light reflection while the image clarity is improved and which has glossiness not likely to be changed even if an exterior force, such as abrasion, is applied, the glossiness described above being difficult to be achieved by the moth-eye structure having long and thin convex portions disclosed in the above PTL 1, and as a result, the present invention was finally made.

According to the present invention, since the printed material has a fine irregular layer containing spherical particles on the color material layer, the light reflection can be preferably suppressed at an outermost surface of the printed material, and the visibility of a printed image can be improved. In addition, since a plurality of spherical particles contained in the fine irregular layer is present in a thickness direction of the fine irregular layer, even when some particles are eliminated due to an exterior force, such as abrasion, the light reflection can also be suppressed by spherical particles present in a lower layer. As a result, there can be obtained a printed material which has an excellent visibility and, even when an exterior force is applied thereto, which also has glossiness not likely to be changed and visibility not likely to be degraded.

In the printed material described above, the fine irregular layer present at the surface of the printed material contains the spherical particles having an average particle diameter of 110 to 400 nm. Since the spherical particles as described above are allowed to be present at the surface of the printed material, an effect similar to that of the moth-eye structure can be obtained. An apparent refractive index of the fine irregular layer is believed to be a volume average of the inherent refractive index of the spherical particles and the refractive index of air present between the spherical particles. In addition, since the spherical particles having the above average particle diameter are present at the surface of the printed material, the volume average refractive index is continuously changed from the surface to the inside of the printed material, and hence, a non-continuous interface of the refractive index which causes the reflection can be eliminated. As a result, the printed material described above can suppress light reflection. In addition, since the spherical particles have an average particle diameter of 400 nm or less, which is less than the wavelength of visible light, irregularities which are not likely to be recognized by human eyes are formed, and hence, the irregularities of the printed material are not visually observed. Accordingly, the glossiness of the image is not so much influenced by the presence of the fine irregular layer on the color material layer. When the average particle diameter of the spherical particles is less than 110 nm, since the refractive index from the surface to the inside of the fine irregular layer is increased, the light reflection cannot be sufficiently suppressed. In addition, when the average particle diameter of the spherical particles is more than 400 nm, since visible light is scattered by the spherical particles present at the surface of the printed material, by this light scattering, the glossiness of the image may be influenced in some cases.

In addition, since a plurality of spherical particles is present in a thickness direction of the fine irregular layer, even if some spherical particles are eliminated by an exterior force, such as abrasion, other spherical particles are further present in a layer located under the spherical particles thus eliminated, and hence, the average refractive index and the smoothness of the fine irregular layer can be maintained.

Furthermore, the surface of the fine irregular layer has convex portions having an average height of 0.04 to 0.15 μm. Since the surface of the fine irregular layer has convex portions having the average height in the range described above, the change in apparent refractive index from the surface to the inside of the printed material can be set in an appropriate range, and as a result, the light reflection can be suppressed. When the average height of the convex portions is smaller than the above range, the effect of suppressing light reflection can be hardly expected. In addition, when the average height of the convex portions is larger than the above range, although the effect of suppressing light reflection is high, cloudiness (haze) is generated in the fine irregular layer, and as result, problems, such as degradation in image quality and difficult formation of the fine irregular layer, may arise.

In addition, the convex portions of the surface of the fine irregular layer are derived from the spherical particles contained in the fine irregular layer. That is, some of the spherical particles contained in the fine irregular layer are exposed to the surface of the fine irregular layer, and the exposed portions of the spherical particles each form the convex portion of the surface of the fine irregular layer.

FIGS. 1 to 4 are cross-sectional views each showing one example of the printed material according to the present invention. The printed material shown in FIG. 1 includes a recording medium 101, a color material layer 102 formed on the recording medium 101, and a fine irregular layer 103 formed on the color material layer 102. In addition, in the printed material shown in FIG. 1, the fine irregular layer 103 contains spherical particles 104. In addition, in the printed material shown in FIG. 2, a fine irregular layer 103 contains spherical particles 104 and a binding resin 105. In the printed material shown in FIG. 3, a fine irregular layer 103 contains spherical particles 106 having a small particle diameter and spherical particles 107 having a large particle diameter. In the printed material shown in FIG. 4, a fine irregular layer 103 contains spherical particles 106 having a small particle diameter and spherical particles 107 having a large particle diameter and is formed so that the existence probability of the particles 107 having a large particle diameter is high at a surface side of the fine irregular layer, and the existence probability of the particles 106 having a small particle diameter is high at a color material layer side. As a result, the particle diameter at a peak position of a particle size distribution of the spherical particles located at the surface side of the fine irregular layer 103 is larger than the particle diameter at a peak position of the particle size distribution of the spherical particles located at the color material layer side of the fine irregular layer.

Hereinafter, members each forming a printed material of this embodiment will be described in detail.

<Fine Irregular Layer>

A fine irregular layer is a layer formed on a surface of a color material layer which will be described later and contains spherical particles having an average particle diameter of 110 to 400 nm. In addition, since an image definition C(2) at an optical comb width of 2 mm of a printed material (image) is 50% or more, the printed material has a high image clarity. In addition, the fine irregular layer preferably covers 90% or more of the surface of the color material layer which will be described later and more preferably covers 100% thereof.

(a) Structure of Fine Irregular Layer

The shape of a convex portion of the fine irregular layer is not particularly limited as long as being derived from the spherical particles having an average particle diameter of 110 to 400 nm. In this embodiment, in view of effective decrease in refractive index, coloration suppression, and haze suppression, the average particle diameter of the spherical particles forming the fine irregular layer is preferably 110 to 390 nm, more preferably 110 to 380 nm, further preferably 110 to 370 nm, and particularly preferably 110 to 300 nm. In addition, at a surface of the fine irregular layer, the spherical particles are not required to be periodically disposed. Unlike the moth-eye structure in which irregular structures are orderly disposed, even when the particles are randomly disposed, a reflected light suppression effect can be obtained in this embodiment. In addition, the haze described in this specification indicates a phenomenon in which an image looks white due to scattering in association with a rapid change in refractive index and/or multiple scattering in the fine irregular layer. The haze value of the image is preferably 20 or less.

In addition, in the fine irregular layer, at least a part of the surface thereof may have the convex portions having an average height of 0.04 to 0.15 μm, and the image definition C(2) may be 50% or more. For example, in a region of the surface of the fine irregular layer having a length of 50 μm and a width of 50 μm, when convex portions having an average height of 0.04 to 0.15 μm are formed derived from the spherical particles, and the image definition C(2) is set to 50% or more, at least in the region described above, the image clarity can be increased, and light reflection can be suppressed.

Accordingly, as a recording medium, besides a medium, such as glossy paper, having a very small surface irregularity, the present invention can also be applied to a medium, such as luster paper, having an irregular surface with a cycle of 100 to 500 μm (interval between convex portions is 100 to 500 μm). The irregularity of the surface of the luster paper can be visually recognized. When the color material layer and the fine irregular layer according to the present invention are formed using this luster paper as the recording medium, while irregular feeling of the luster paper itself is maintained, an image having a high image clarity and a low light reflection can be formed. The reason for this is that since an inherent visible irregular surface of the luster paper is covered with the fine irregular layer according to the present invention, the irregularity in a region less than visible limit which has an influence on light reflection can be controlled. Hence, the fine irregular layer according to the present invention may also be defined so as to be smoothed at a cycle of from visible light to less than visible limit. In this case, "the cycle of less than visible limit" indicates approximately several tens of micrometers. In particular, the "cycle of from visible light to less than visible limit" is preferably a cycle of from 0.8 to 100 μm.

(b) Material of Fine Irregular Layer

Hereinafter, components each usable for the fine irregular layer of this embodiment will be described.

(1) Spherical Particles

The fine irregular layer contains spherical particles. In the present invention, the spherical particles are particles in each of which the ratio of the maximum diameter and the minimum diameter of the particle cross-section is 1.4 or less. In addition, the diameter of the particle cross-section can be measured by a scanning electron microscope (manufactured by Hitachi High-Technologies Corporation, S-4800). As the spherical particles, various resin particles may be mentioned. A material of the resin particles is not particularly limited, and a known resin may be appropriately used. In particular, resins to be contained in an auxiliary liquid and a first auxiliary liquid, each of which will be described later, may be used. In addition, the fine irregular layer preferably contains at least two types of spherical particles having different average particle diameters. Since at least two types of spherical particles having different average particle diameters are contained, voids formed by the spherical particles having a large particle diameter can be filled with the spherical particles having a small particle diameter. As a result, the difference in volume average refractive index between the vicinity of the surface of the fine irregular layer and the inside thereof can be decreased, and coloration derived from the voids in the fine irregular layer can also be reduced. In addition, since a contact area among the spherical particles is increased, the toughness of the fine irregular layer as the film is increased. In addition, the fine irregular layer has at least two types of spherical particles, and the particle diameter at a peak position of a particle size distribution of the spherical particles located at a surface side of the fine irregular layer is preferably larger that the particle diameter at a peak position of the particle size distribution of the spherical particles located at a color material layer side of the fine irregular layer. Since the particles each have a spherical shape, and a plurality of spherical particles having different particle diameters is used, a void rate can be changed in a stepwise manner. As a result, the volume average refractive index is continuously changed from the surface to the inside of the fine irregular layer, and a non-continuous interface of the refractive index which causes reflection can be eliminated. As a result, the printed material described above can further suppress light reflection.

(2) Resin

The fine irregular layer preferably contains a resin. This resin is preferably a binding resin which binds spherical particles to each other. As the resin contained in the fine irregular layer, a resin contained in the auxiliary liquid and the first auxiliary liquid, which will be described later, may be used. When resin particles contained in the auxiliary liquid are used as the binding resin, a solid component thereof is preferably melted or softened by heat, electromagnetic waves, and/or an external force. The melting in this case indicates that when resin particles having crystallinity are heated to the melting point thereof or more, the solid state is changed into a liquid state. In addition, the softening indicates that amorphous resin particles having a glass transition temperature are changed from a glass state to a rubber state. When the fine irregular layer is formed from the resin described above together with spherical particles, the difference in volume average refractive index between the vicinity of the surface of the fine irregular layer and the inside thereof can be decreased, and in addition, the coloration derived from the voids in the fine irregular layer can also be reduced. In addition, the toughness of the fine irregular layer as the film is not only increased, but also particles at an outermost surface of the fine irregular layer can be suppressed from being eliminated. In addition, the coloration in this specification indicates a phenomenon which occurs by a decrease in reflectance at a wavelength approximately two times the particle diameter decreases.

(3) Surfactant

The fine irregular layer of this embodiment may also contain a surfactant. As the surfactant, in particular, for example, Acetylenol EH (manufactured by Kawaken Fine Chemicals Co., Ltd.) may be mentioned.

(4) Other Additives

The fine irregular layer of this embodiment may contain, besides the components described above, if needed, various additives, such as a pH adjuster, an antirust agent, an antiseptic, a fungicide, an antioxidant, an anti-reducing agent, a water-soluble resin and its neutralizing agent, a viscosity adjuster, and a leveling agent.

<Color Material Layer>

A color material layer of this embodiment is formed on a recording medium and contains a pigment. Hereinafter, components each usable for the color material layer of this embodiment will be described.

(a) Color Material

The color material layer contains a pigment as a color material. The type of pigment is not particularly limited. As a particular example of the pigment, a pigment to be contained in an ink, which will be described later, may be used. In addition, as the color material, a dye may also be used together with the pigment. As the dye, a known dye may be used.

(b) Pigment Dispersant

The color material layer may also contain a pigment dispersant. As the dispersant dispersing a pigment, a known dispersant used for ink jet may be used. In particular, a pigment dispersant to be contained in the ink which will be described later may be used.

In addition, without using the dispersant, a so-called self-dispersing pigment dispersible by reforming of the surface thereof may also be preferably used in the present invention.

(c) Resin Particles

The color material layer may contain various types of particles. In particular, resin particles are preferable since an effect of improving image quality and/or fixing property may be obtained in some cases.

A material of resin particles usable in the present invention is not particularly limited, and a known resin may be appropriately used. In particular, resin particles to be contained in the ink which will be described later may be used.

(d) Surfactant

The color material layer may contain a surfactant. As the surfactant, in particular, for example, an acetylene glycol ethylene oxide adduct (Acetylenol E100, manufactured by Kawaken Fine Chemicals Co., Ltd.) may be mentioned.

(e) Water and Water-Soluble Organic Solvent

The color material layer may also contain as a solvent, water and/or a water-soluble organic solvent. Water is preferably water deionized by ion-exchange or the like.

In addition, the type of water-soluble organic solvent is not particularly limited, and any known water-soluble organic solvent may be used. In particular, a water-soluble organic solvent to be contained in the ink which will be described later may be used.

(f) Other Additives

Besides the components described above, the color material layer may also contain, if needed, various additives, such as a pH adjuster, an antirust agent, an antiseptic, a fungicide, an antioxidant, an anti-reducing agent, a water-soluble resin and its neutralizing agent, and a viscosity adjuster.

<Recording Medium>

As a recording medium, a material is not particularly limited as long as the fine irregular layer according to the present invention can be formed. As a recording medium to be used in this embodiment, generally used printing paper or a non-permeable medium may be used, and for example, regular paper, coated paper, matte paper, luster paper, or a film may be mentioned.

2. Image Recording Apparatus

As a first aspect, an image recording apparatus of this embodiment includes a reaction liquid application means, an ink application means, an auxiliary liquid application means, and a fine irregular layer forming means. By the reaction liquid application means, a reaction liquid can be applied on a recording medium. By the ink application means, an ink can be applied to the reaction liquid applied on the recording medium. By the auxiliary liquid application means, an auxiliary liquid containing particles can be applied to the reaction liquid and the ink applied on the recording medium. Furthermore, by the fine irregular layer forming means, an image having a fine irregular layer as an outermost layer can be formed by treating so as to have convex portions having an average height of 0.04 to 0.15 μm and an image definition C(2) of the image of 50% or more at an optical comb width of 2 mm. In addition, as the auxiliary liquid, since a liquid containing at least two types of spherical particles having an average particle diameter of 110 to 400 nm is used, the fine irregular layer can be formed so that voids formed by spherical particles having a large particle diameter in the fine irregular layer are filled with spherical particles having a small particle diameter.

In addition, a plurality of auxiliary liquid application means may also be provided. In the case in which a plurality of auxiliary liquid application means is provided, when application amounts of first spherical particles and second spherical particles which have particle diameters different from each other and which are applied from auxiliary liquid application means different from each other are adjusted, a particle size distribution of the particles having different particle diameters in the fine irregular layer to be formed can be adjusted.

In addition, as a second aspect, an image recording apparatus of this embodiment includes a reaction liquid application means, a first auxiliary liquid application means, an ink application means, a transfer means, and a fine irregular layer forming means. By the reaction liquid application means, a reaction liquid can be applied on a transfer member. By the first auxiliary liquid application means, a first auxiliary liquid containing particles can be applied to the reaction liquid applied on the transfer member. By the ink application means, an ink can be applied to the reaction liquid and the first auxiliary liquid applied on the transfer member. Furthermore, by the transfer means, an intermediate image on the transfer member can be transferred to a recording medium. By the fine irregular layer forming means, an image having a fine irregular layer as an outermost layer can be formed by treating so as to have convex portions having an average height of 0.04 to 0.15 μm and an image definition C(2) of the image of 50% or more at an optical comb width of 2 mm.

In addition, a plurality of auxiliary liquid application means may also be provided. In the case in which a plurality of auxiliary liquid application means is provided, when application amounts of first spherical particles and second spherical particles which have particle diameters different from each other and which are applied from auxiliary liquid application means different from each other are adjusted, a particle size distribution of the particles having different particle diameters in the fine irregular layer to be formed can be adjusted.

Figure 5:
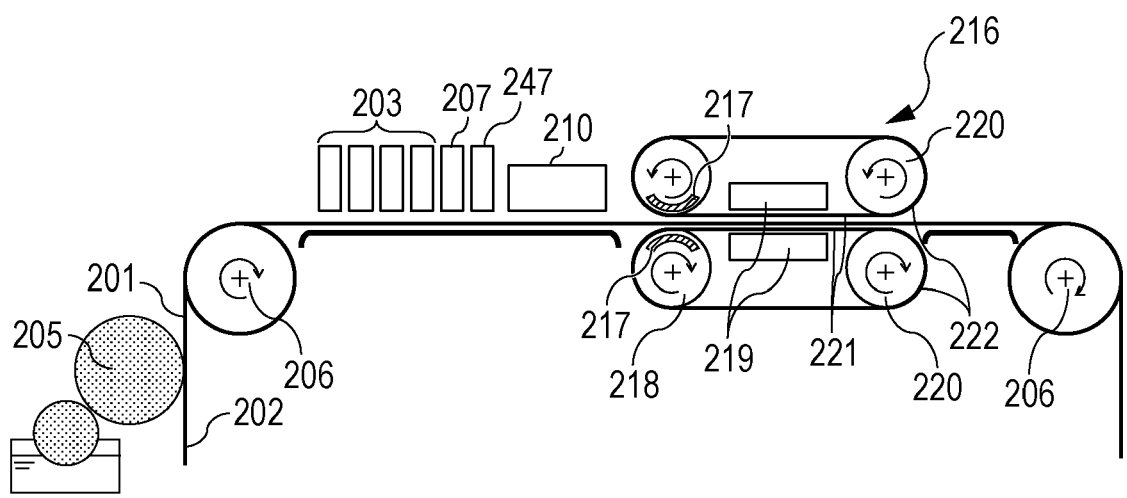
FIG. 5 is a schematic view of one example of an image recording apparatus according to the present invention.

FIG. 5 is a schematic view showing an image recording apparatus according to the first aspect. The image recording apparatus shown in FIG. 5 includes a belt-shaped transport member 202 and a recording medium 201 disposed on an upper surface thereof. The recording medium 201 on the transport member 202 is configured to be transported when a shaft 206 is rotary driven in an arrow direction, and the individual means disposed therearound are configured to be operated in synchronous with the operation described above.

In addition, as the reaction liquid application means for applying a reaction liquid, a roller type coating device 205 is disposed on the transport member 202. In this roller type coating device 205, a reaction liquid filled in a reaction liquid container is moved on the outer circumference surfaces of two rollers by the rotation thereof. In addition, by the rotation of the roller in contact with the outer circumference surface of the recording medium 201, the reaction liquid is applied on the recording medium 201 from this roller.

At a downstream side of the roller type coating device 205 in a transport direction, ink jet devices 203 and 207 are disposed to face an upper surface of the recording medium 201. An ink and an auxiliary liquid are configured to be applied to the upper surface of the recording medium 201 from the ink jet device (ink application means) 203 and the ink jet device (auxiliary liquid application means) 207, respectively. As the ink jet devices 203 and 207, a device which performs ink ejection by an on-demand method using an electrothermal transducer is used. Those ink jet devices include line head-type ink jet heads disposed in the form of a line approximately parallel to the shaft 206. As described above, the reaction liquid, the ink, and the auxiliary liquid are applied in this order on the upper surface of the recording medium 201, and hence, a recorded image is formed from those liquids. In addition, besides the ink jet device 207, an ink jet device 247 which is another auxiliary liquid application means may also be disposed. In addition, when auxiliary liquids containing spherical particles having different particle diameters are separately applied, by the use of the ink jet devices 207 and 247, the auxiliary liquids containing spherical particles having different particle diameters can be separately applied. For example, from the ink jet device (auxiliary liquid application means) 207 close to the ink jet device (ink application means) 203, an auxiliary liquid (such as an auxiliary liquid containing spherical particles having a small average particle diameter) containing a large amount of small particles is applied. In addition, from the ink jet device (auxiliary liquid application means) 247, an auxiliary liquid (such as an auxiliary liquid containing spherical particles having a large average particle diameter) containing a large amount of large particles is applied. As a result, the fine irregular layer can be formed from a layer containing the spherical particles having a small particle diameter and a layer containing the spherical particles having a large particle diameter. Furthermore, in order to decrease a liquid component in the recorded image on the recording medium 201, a blower device 210 is disposed. Accordingly, the liquid component in the recorded image is decreased, and for example, feathering in which the ink spreads along fibers of the recording medium can be prevented, so that a preferable final image can be obtained. At a further downstream side of the recording medium 201 in the transport direction, a fine irregular layer forming means is formed to include: pressure rollers 218 each of which have a heating heater 217; cooling portions 219: and peeling rollers 220. Between the pressure roller 218 and the peeling roller 220, a transport belt 221 is provided, and on a surface of the transportation belt 221, a fixing substrate 222 formed from a heat resistant film or the like is disposed. The heating heater 217 is configured to be able to melt and/or soften at least a part of resin particles and/or a water-soluble resin on the recording medium 201. In the apparatus shown in FIG. 5, after the image on the recording medium 201 is softened and/or melted, by pressure application, an image having a fine irregular layer at the surface is formed. Furthermore, while maintaining a close contact state, the recording medium 201 and the fixing substrate 222 are cooled by a cooling device 219, and peeling is performed by fixing rollers 220.

The recording medium 201 may be either printing paper or a non-permeable medium and may also be, for example, regular paper, coated paper, matte paper, luster paper, or a film. In addition, the recording medium 201 may be either a single sheet having a predetermined size formed by cutting or a long rolled sheet.

Figure 6:
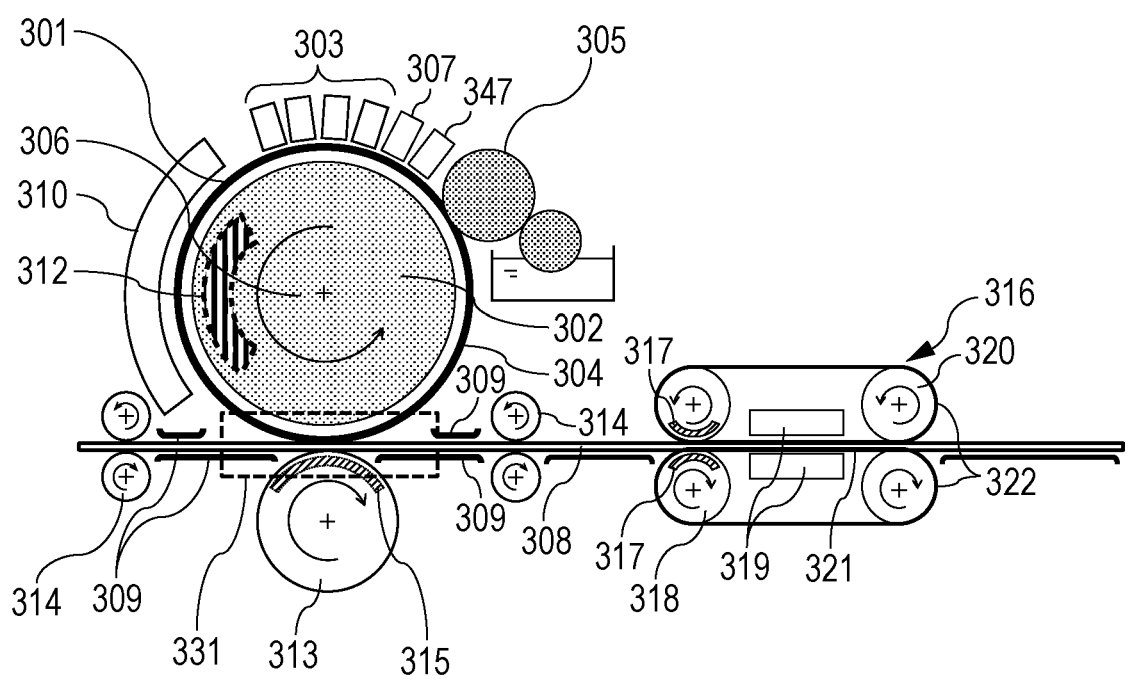
FIG. 6 is a schematic view of one example of the image recording apparatus according to the present invention.

FIG. 6 is a schematic view showing an image recording apparatus of an embodiment which is the second aspect. The image recording apparatus shown in FIG. 6 includes a transfer member 301 formed from a rotatable drum-shaped support member 302 and a surface layer member 304 disposed on the outer circumference surface thereof. The support member 302 is rotary driven around the center of a shaft 306 in an arrow direction, and in synchronous with this rotation, the individual means disposed therearound are configured to be operated.

In addition, as a reaction liquid application means for applying a reaction liquid to the outer circumference surface of the transfer member 301, a roller type coating device 305 is disposed. In this roller type coating device 305, by the rotation of two rollers, a reaction liquid filled in a reaction liquid container is moved on the outer circumference surfaces of those rollers. In addition, by the rotation of the roller in contact with the outer circumference surface of the transfer member 301, the reaction liquid is applied to the outer circumference surface of the transfer member 301.

At a downstream side with respect to the rotation direction of the transfer member 301, ink jet devices 303 and 307 are disposed to face the outer circumference surface of the transfer member 301. An ink and an auxiliary liquid are configured to be applied to the outer circumference surface of the transfer member 301 from the ink jet device (ink application means) 303 and the ink jet device (auxiliary liquid application means) 307, respectively. As the ink jet devices 303 and 307, a device which performs ink ejection by an on-demand method using an electrothermal transducer is used. Those ink jet devices include line head-type ink jet heads disposed in the form of a line approximately parallel to the shaft 306 of the transfer member 301. As described above, the reaction liquid, the auxiliary liquid, and the ink are applied in this order on the outer circumference surface of the transfer member 301, and hence, an intermediate image (mirror-reversed image) formed from those liquids is formed. In addition, besides the ink jet device 307, an ink jet device 347 which is another auxiliary liquid application means may be further disposed. In addition, when auxiliary liquids containing spherical particles having different particle diameters are separately applied, by the use of the ink jet devices 307 and 347, the auxiliary liquids containing spherical particles having different particle diameters can be separately applied. For example, as is the case of the first aspect, the auxiliary liquid applied from the ink jet device (auxiliary liquid application means) 307 or 347 is an auxiliary liquid (such as an auxiliary liquid containing spherical particles having a small average particle diameter) containing spherical particles having a different particle diameter. From the ink jet device (auxiliary liquid application means) 307 close to the ink jet device (ink application means) 303, an auxiliary liquid (such as an auxiliary liquid containing spherical particles having a small average particle diameter) containing a large amount of small particles is applied. From the ink jet device (auxiliary liquid application means) 347, an auxiliary liquid (such as an auxiliary liquid containing spherical particles having a large average particle diameter) containing a large amount of large particles is applied. As a result, the fine irregular layer can be formed from a layer containing the spherical particles having a small particle diameter and a layer containing the spherical particles having a large particle diameter. Furthermore, in order to decrease a liquid component in the intermediate image on the transfer member 301, a blower device 310 is disposed. Accordingly, the liquid component in the intermediate image is decreased, and the image is suppressed from being disturbed during the transfer, so that a preferable image can be obtained. In the support member 302 of the transfer member 301, a heating heater (temperature adjustment means) 312 is embedded. At a further downstream side of the transfer member 301 in the rotation direction, a pressure roller 313 having the outer circumference surface facing the outer circumference surface of the transfer member 301 is disposed, and a transfer means is formed from the transfer member 301 and the pressure roller 313. By this pressure roller 313, the intermediate image on the transfer member 301 is brought into contact with a recording medium 308 and is configured to be transferred on the recording medium 308. In addition, in the pressure roller 313, a cooling portion (temperature adjustment means) 315 is embedded. As described above, in the apparatus shown in FIG. 6, the intermediate image on the transfer member 301 and the recording medium 308 are pressurized since being sandwiched by the transfer member 301 and the pressure roller 313, and as a result, efficient image transfer is realized. That is, in an actual transfer step, in an image transfer portion 331, the intermediate image formed on the transfer member 301 is brought into contact with the recording medium 308 which is transported along a transport guide 309 by the rotation of transfer rollers 314. In addition, the intermediate image is peeled away from the transfer member 301 and is transferred on the recording medium 308.

At a further downstream side of the image transfer portion 331, a fine irregular layer forming means including: pressure rollers 318 each of which have a heating heater 317; cooling portions 319: and peeling rollers 320 is formed. Between the pressure roller 318 and the peeling roller 320, a transport belt 321 is provided, and on a surface of the transport belt 321, a fixing substrate 322 having an excellent smoothness and formed from a heat resistant film or the like is disposed. The heating heater 317 is configured to be able to melt and/or soften at least a part of resin particles and/or a water-soluble resin on the recording medium 308 on which the image is recorded in the image transfer portion 331. In the apparatus shown in FIG. 6, after the image on the recording medium 308 is softened and/or melted, by pressure application, an image having a fine irregular layer at the surface is formed. Furthermore, while maintaining a close contact state, the recording medium 308 and the fixing substrate 322 are cooled by a cooling device 319, and peeling is performed by the fixing rollers 320.

The recording medium 308 may be either printing paper or a non-permeable medium and may also be, for example, regular paper, coated paper, matte paper, luster paper, or a film. In addition, the recording medium 308 may be either a single sheet having a predetermined size formed by cutting or a long rolled sheet.

Figure 7:
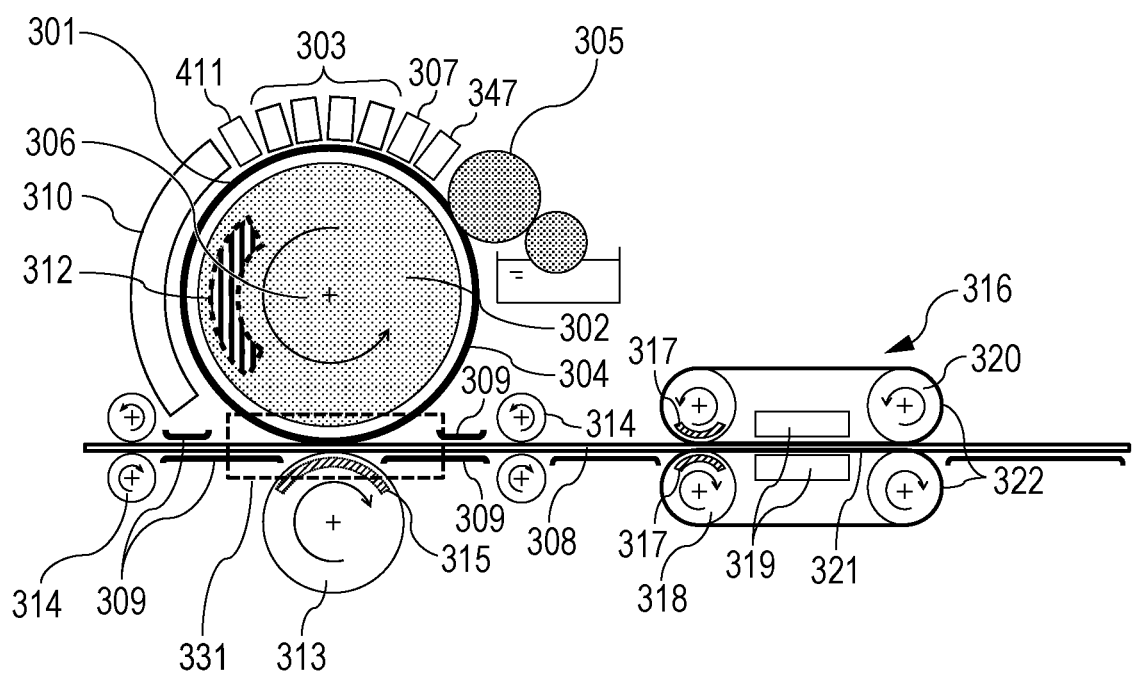
FIG. 7 is a schematic view of one example of the image recording apparatus according to the present invention.

FIG. 7 is a schematic view showing an image recording apparatus of another embodiment of the second aspect and is different from the image recording apparatus shown in FIG. 6 since a second auxiliary liquid 411 is provided. In the apparatus shown in FIG. 7, a first temperature of a transfer member 301 in an image transfer portion 331 is set to a temperature equivalent to or more than the glass transition temperature of a water-soluble resin derived from a second auxiliary liquid in an intermediate image by a heating heater 312. On the other hand, the temperature of a recording medium 308 is set to less than the glass transition temperature. As a result, when the intermediate image in the image transfer portion 331 is transferred, an adhesion force between the intermediate image and the recording medium 308 is higher than an adhesion force between the intermediate image and the transfer member 301, so that the intermediate image is efficiently transferred to the recording medium 308. In addition, besides cooling by the recording medium 308, the temperature during the transfer may be cooled to less than the glass transition temperature of the water-soluble resin by a cooling portion (temperature adjustment means) 315 embedded in a pressure roller 313.

Figure 8:
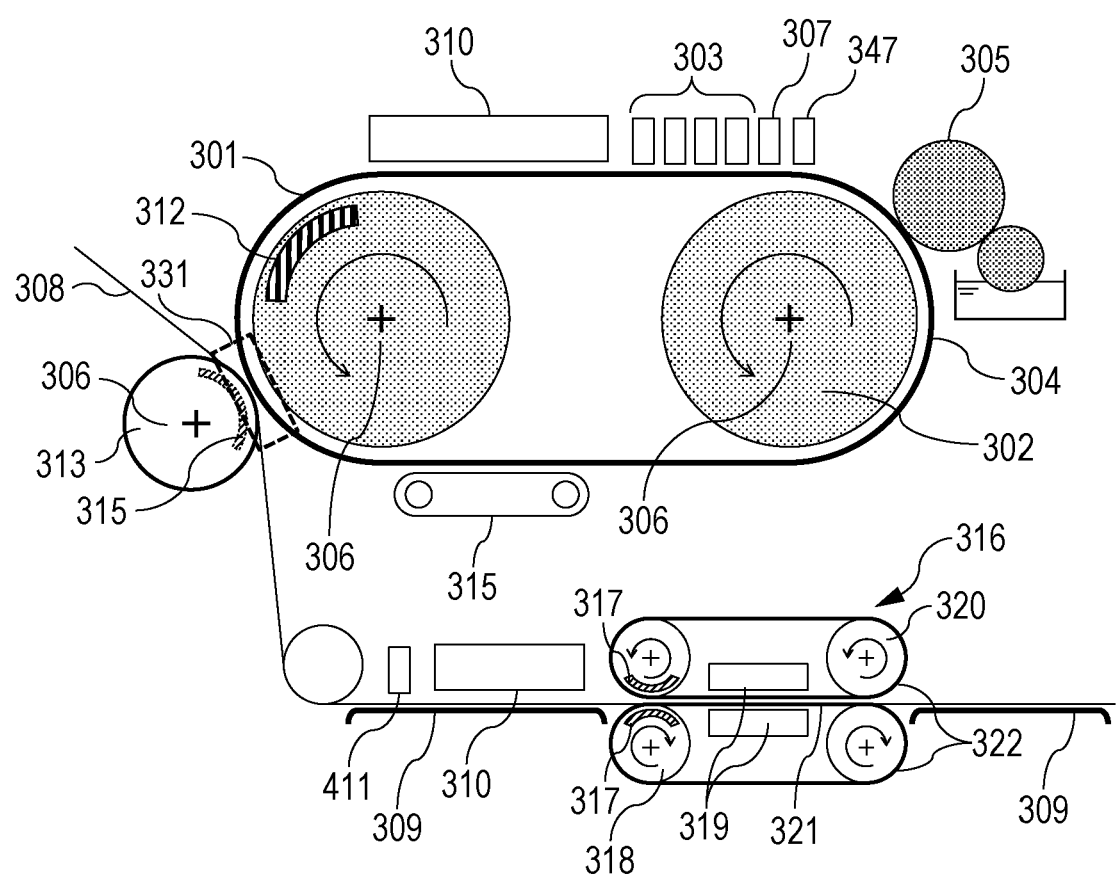
FIG. 8 is a schematic view of one example of the image recording apparatus according to the present invention.

FIG. 8 is a schematic view showing an image recording apparatus of another embodiment of the second aspect and is different from the recording apparatus shown in FIG. 6 since a belt-shaped transfer member 301 is provided. In addition, a second auxiliary liquid 411 is disposed at a downstream of an image transfer portion 331.

In the image recording apparatuses shown in FIGS. 7 and 8, since the structure other than that described above is the same as that shown in FIG. 6, description thereof is omitted.

Figure 9:
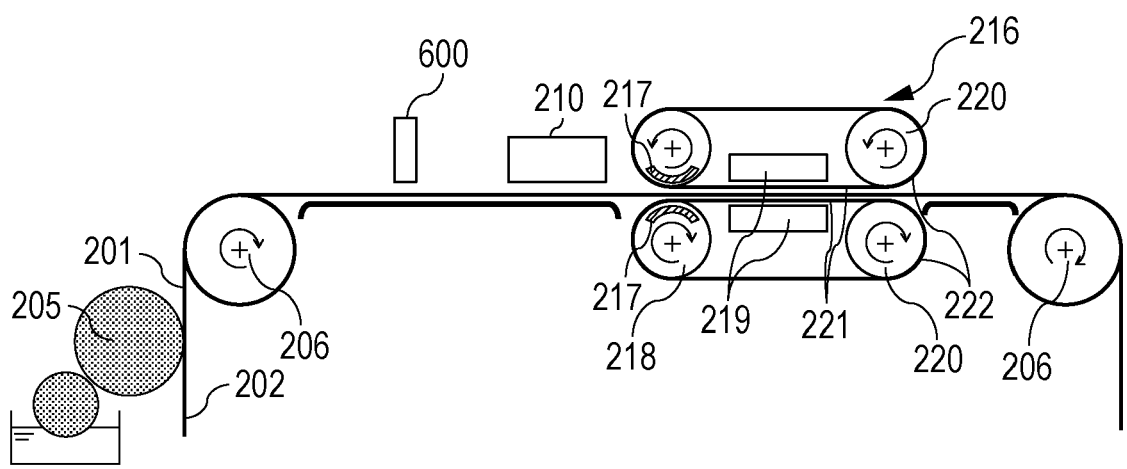
FIG. 9 is a schematic view of one example of the image recording apparatus according to the present invention.
Figure 10:
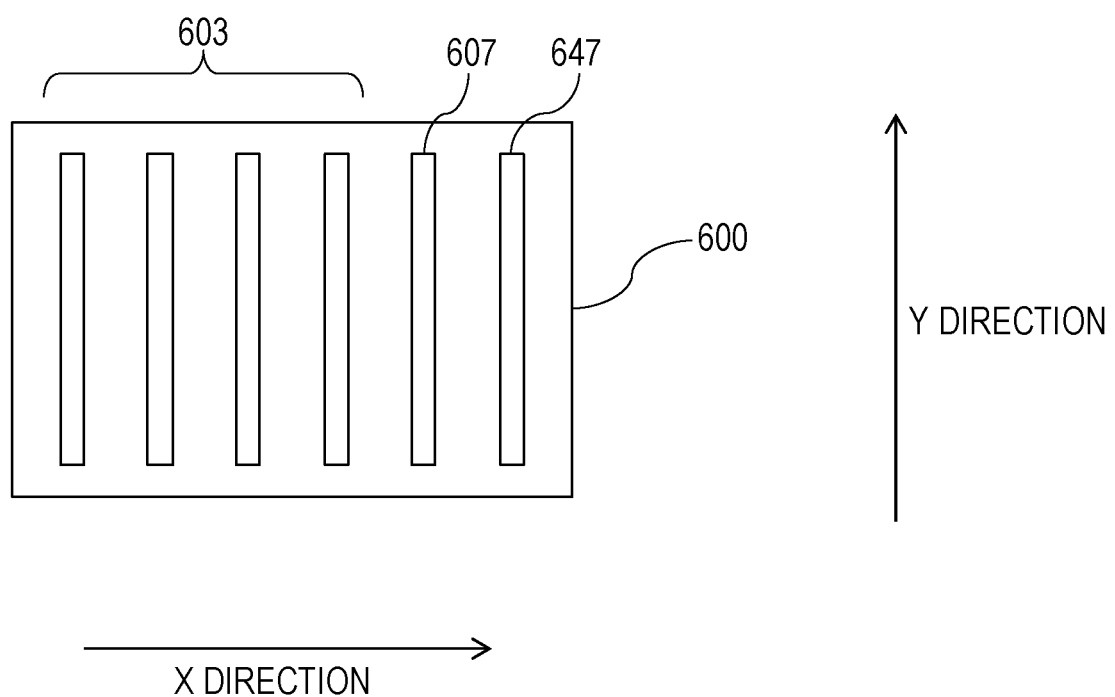
FIG. 10 is a schematic view of a recording head used for one example of the image recording apparatus according to the present invention.
Figure 11:
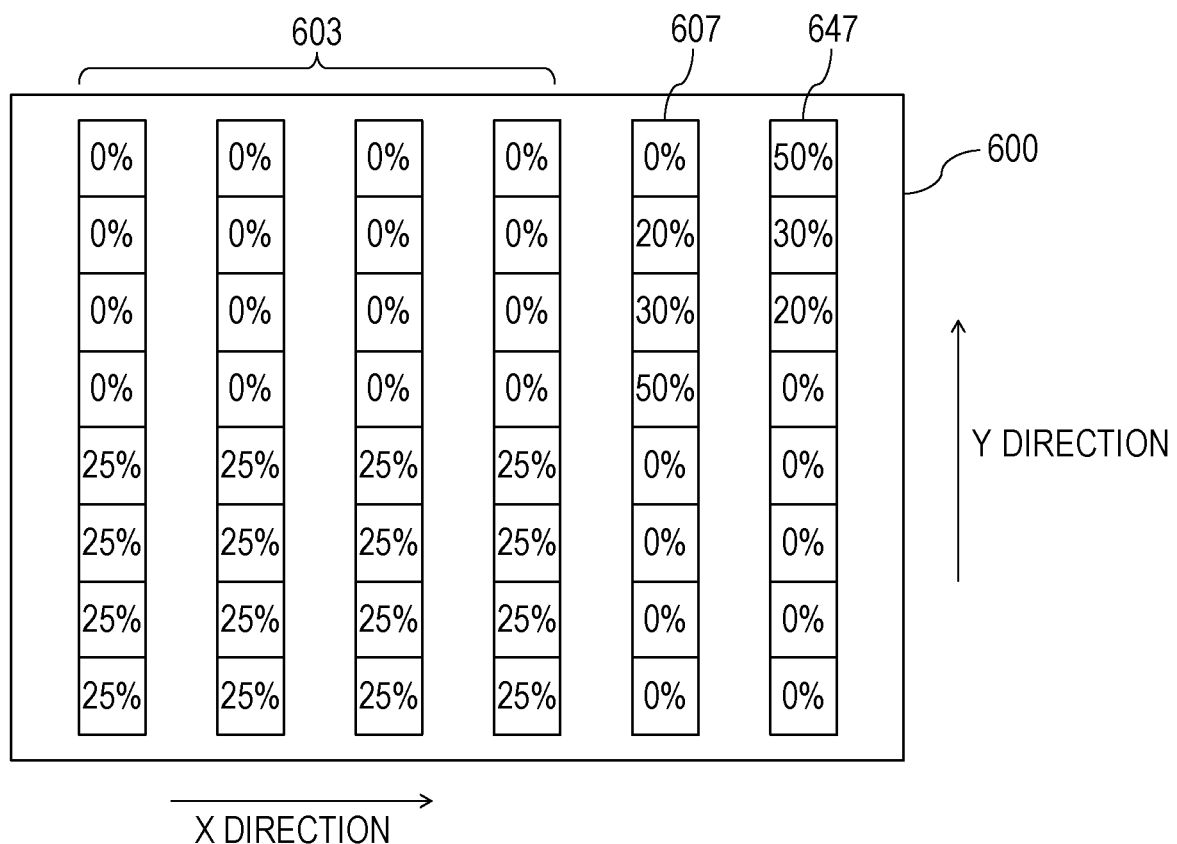
FIG. 11 is a schematic view of one example of an image recording method according to the present invention.
Figure 12:
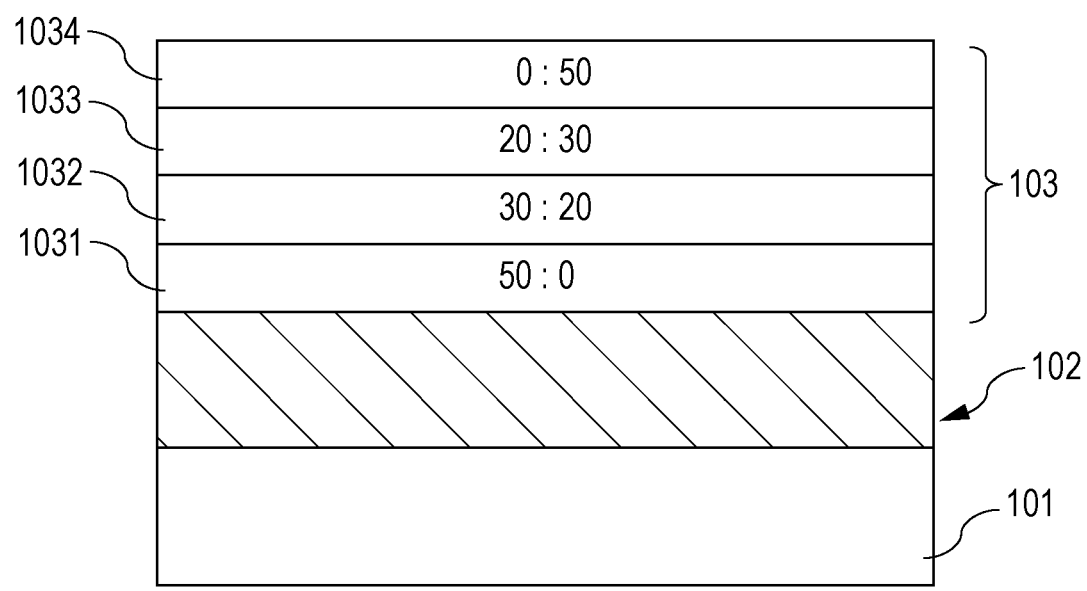
FIG. 12 is a conceptual cross-sectional view of one example of the printed material according to the present invention.

FIG. 9 is a schematic view showing an image recording apparatus of another embodiment of the first aspect and is different from the image recording apparatus shown in FIG. 5 since the ink application means and the auxiliary liquid application means are provided as one head structure. FIG. 10 is a schematic view showing an ink application means and an auxiliary liquid application means 600, and nozzle lines of an ink application means 603 and auxiliary liquid application means 607 and 647 are disposed approximately in parallel in a Y direction which is a transport direction of a recording medium. The ink application means 603 and the auxiliary liquid application means 607 and 647 are reciprocally scanned in an X direction, so that a recorded image is formed from those liquids. In this case, auxiliary liquids to be applied from the ink jet devices (auxiliary liquid application means) 607 and 647 are auxiliary liquids containing spherical particles having different particle diameters. A fine irregular layer in which the void rate is changed in a stepwise manner is formed by a recording method, such as a multi-pass. FIG. 11 schematically shows one example of liquid application of the ink application means 603 and the auxiliary liquid application means 607 and 647 by the multi-pass. In FIG. 11, the nozzle lines are each equally divided into 8 regions, and a mask pattern assigned to the respective regions is set. Since the mask pattern is operated with image data corresponding to each pixel, the image data is recorded as data divided by each nozzle, so that the image is uniformed. The ink application means 603 uses a 25%-mask pattern exclusively set in four regions located at an upstream side of paper transportation among the eight divided regions and also uses a 0%-mask pattern in four regions located at a downstream side, so that an image is formed in the upstream-side four regions. On the other hand, the auxiliary liquid application means 607 and 647 use a 0%-mask pattern in four regions located at the upstream side of the paper transportation among the eight divided regions and also use a mask pattern exclusively set in four regions located at the downstream side in which the total is set to 100%, so that an image is formed in the downstream-side four regions. After the ink application means and the auxiliary liquid application means 607 and 647 are operated in the X direction, the recording medium 201 is repeatedly transported in the Y direction only by one of the eight divided regions, so that all the image data is recorded. FIG. 12 is a conceptual view showing a cross-section of a printed material recorded using the mask pattern shown in FIG. 11. The printed material shown in FIG. 12 includes a recording medium 101, an ink layer (color material layer) 102 formed on the recording medium 101, and a fine irregular layer 103 formed on the ink layer 102. Since being formed by the multi-pass, the fine irregular layer 103 is formed of four auxiliary liquid layers 1031, 1032, 1033, and 1034. Since the auxiliary liquid layer 1031 corresponds to recording by a fourth nozzle line from the above among the eight divided regions, 50% and 0% are recorded by the auxiliary liquid application means 607 and the auxiliary liquid application means 647, respectively. As a result, an auxiliary liquid layer is formed so that the ratio of the particles contained in the auxiliary liquid applied by the auxiliary liquid application means 607 and the particles contained in the auxiliary liquid applied by the auxiliary liquid application means 647 is 50:0. As is the case described above, layers having a ratio of the spherical particles of 30:20, a ratio of the spherical particles of 20:30, and a ratio of the spherical particles of 0:50 are formed as the auxiliary liquid layers 1032, 1033, and 1034, respectively.

In addition, in the structure shown in FIG. 9, although the ink application means and the auxiliary liquid application means are integrally formed together, as long as a plurality of auxiliary liquid application means are integrally formed together, all the application means are not always required to be integrally formed together.

Hereinafter, members each forming the image recording of this embodiment will be described in detail.

<Transfer Member>

The transfer member of the second aspect of the present invention includes a surface layer having an image forming surface. As a member of the surface layer, although various materials, such as a resin and a ceramic, may be appropriately used, in view of the durability or the like, a material having a high compressive elastic modulus is preferable. In particular, for example, there may be mentioned an acrylic resin, an acryl-silicone resin, a fluorine-containing resin, or a condensate obtained by condensation of a hydrolysable organic silicone compound. In order to improve the wettability, the transfer property, and the like of the reaction liquid, a surface treatment may be performed. As the surface treatment, for example, there may be mentioned a flame treatment, a corona treatment, a plasma treatment, a polishing treatment, a roughening treatment, an active energy ray irradiation treatment, an ozone treatment, a surfactant treatment, or a silane coupling treatment. A plurality of treatments selected from those mentioned above may be used in combination. In addition, an arbitrary surface shape may be provided in the surface layer.

The transfer member applied to the present invention preferably includes a compressive layer having a function of absorbing the change in pressure. Since the compressive layer is provided, the compressive layer can absorb deformation, disperse the change in local pressure, and maintain a preferable transfer property even during rapid printing. As a member of the compressive layer, for example, there may be mentioned an acrylonitrile-butadiene rubber, an acrylic rubber, a chloroprene rubber, an urethane rubber, or a silicone rubber. When the rubber material mentioned above is molded, predetermined amounts of a vulcanizing agent, a vulcanizing accelerator, and the like are blended, and furthermore, if need, a foaming agent, hollow fine particles, or a filler, such as table salt, is preferably added to form a porous member. Accordingly, since air bubble portions are compressed together with the change in volume in response to various changes in pressure, the deformation in a direction other than a compression direction is small, and hence, stabler transfer property and durability can be obtained. As a porous rubber material, there may be mentioned a continuous air bubble structure in which air bubbles are connected to each other and an independent air bubble structure in which air bubbles are independent from each other. In the present invention, any one of the above structures may be used, and those structures may be used in combination.

The transfer member applied to the present invention preferably includes an elastic layer between the surface layer and the compressive layer. As a member of the elastic layer, various materials, such as a resin and a ceramic, may be appropriately used. In view of processing characteristics and the like, various types of elastomer materials and rubber materials are preferably used. In particular, for example, there may be mentioned a fluoro silicone rubber, a phenyl silicone rubber, a fluorine rubber, a chloroprene rubber, an urethane rubber, a nitrile rubber, an ethylene propylene rubber, a natural rubber, a styrene rubber, an isoprene rubber, a butadiene rubber, a copolymer of ethylene/propylene/butadiene, or a nitrile butadiene rubber. In particular, since having a low compression set, a silicone rubber, a fluoro silicone rubber, and a phenyl silicone rubber are preferable in terms of dimensional stability and durability. In addition, since the change in elastic modulus with temperature is small, and the transfer property is preferable, those rubbers mentioned above are also preferable.

In the present invention, among the surface layer, the elastic layer, and the compressive layer, various types of adhesives and/or double-sided adhesive tapes may be used for fixing and/or maintenance. In addition, in order to suppress lateral elongation in mounting in an apparatus and/or to maintain toughness, a reinforcing layer having a high compressive elastic modulus may also be provided. In addition, a woven-cloth may also be used as a reinforcing layer. The transfer member may be formed of layers using the materials mentioned above in combination.

The size of the transfer member may be freely selected in accordance with the size of a target printed image. The shape of the transfer member is not specifically limited, and in particular, for example, a sheet shape, a roller shape, a belt shape, or an endless web shape may be mentioned.

<Reaction Liquid>

The reaction liquid applied to the present invention contains an ink viscosity-increase component. An increase in ink viscosity also includes the case in which an increase in viscosity of the whole ink is observed and the case in which since some component, such as a color material, forming an ink is aggregated, the viscosity thereof is locally increased. The increase in ink viscosity as described above is generated in such a way that since some component, such as a color material and/or a resin, of a composition forming an ink is brought into contact with an ink viscosity-increase component, a chemical reaction occurs, or physical adsorption occurs. This ink viscosity-increase component described above decreases the fluidity of an ink and/or some component of an ink composition on a recording medium and has an effect of suppressing bleeding and/or beading during image formation. In the present invention, as the ink viscosity-increase component, known materials, such as a polyvalent metal ion, an organic acid, a cationic polymer, and porous particles, may be used. In particular, among those mentioned above, a polyvalent metal ion and an organic acid are preferable. In addition, plural types of ink viscosity-increase components are also preferably contained. In addition, the content of the ink viscosity-increase component in the reaction liquid is preferably 5 percent by mass or more with respect to the total mass of the reaction liquid.

As the polyvalent metal ion, for example, $Ca^{2+}$, $Cu^{2+}$, $Ni^{2+}$, $Mg^{2+}$, $Sr^{2+}$, $Ba^{2+}$, and $Zn^{2+}$ may be mentioned, and as a trivalent metal ion, for example, a trivalent metal ion, such as $Fe^{3+}$, $Cr^{3+}$, $Y^{3+}$, and $Al^{3+}$, may be mentioned.

In addition, as the organic acid, for example, there may be mentioned oxalic acid, a polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pylon carboxylic acid, pyrrole carboxylic acid, furan carboxylic acid, pyridine carboxylic acid, coumalic acid, thiophene carboxylic acid, nicotinic acid, oxysuccinic acid, or dioxysuccinic acid.

The reaction liquid applied to the present invention may contain an appropriate amount of water and/or an organic solvent. In this case, as the water to be used, water deionized by ion exchange or the like is preferable. In addition, the organic solvent usable for the reaction liquid applied to the present invention is not particularly limited, and a known organic solvent may be used.

In addition, the reaction liquid may be used after the surface tension and/or the viscosity thereof is appropriately adjusted by addition of a surfactant and/or a viscosity adjuster. A material to be used is not particularly limited as long as being able to be present together with the ink viscosity-increase component. In particular, as the surfactant, for example, there may be mentioned an acetylene glycol ethylene oxide adduct (Acetylenol E100, manufactured by Kawaken Fine Chemicals Co., Ltd.) or a perfluoroalkyl ethylene oxide adduct (Megafac F444, manufactured by DIC Corporation).

<Ink>

Hereinafter, components each usable for an ink of this embodiment will be described.

(a) Color Material

As a color material contained in the ink to be applied to the present invention, a pigment is used. The type of pigment usable as the color material is not particularly limited. As a particular example of the pigment, for example, there may be mentioned an inorganic pigment, such as carbon black; or an organic pigment, such as azo, phthalocyanine, quinacridone, isoindolinone, imidazolone, diketo pyrrolo pyrrole, or dioxazine. Among those pigments, if needed, one or at least two types thereof may be used. The content of the pigment in the ink is preferably 0.5 to 15.0 percent by mass with respect to the total mass of the ink and more preferably 1.0 to 10.0 percent by mass. In addition, as the color material, a dye may also be used together with the pigment. As the dye, a known dye may be used. In addition, together with an ink containing a pigment, a clear ink containing no color material may also be used.

(b) Pigment Dispersant

The ink may also contain a pigment dispersant. As the dispersant dispersing a pigment, a known dispersant to be used for ink jet may be used. In particular, in the aspect of the present invention, a water-soluble dispersant having both a hydrophilic portion and a hydrophobic portion in the structure is preferably used. In particular, a pigment dispersant formed from a resin obtained by copolymerization of materials containing at least a hydrophilic monomer and a hydrophobic monomer is preferably used. The monomers to be used in this case are not particularly limited, and known monomers are preferably used. In particular, as the hydrophobic monomer, for example, there may be mentioned styrene, a styrene derivative, an alkyl (meth)acrylate, or benzyl (meth)acrylate. In addition, as the hydrophilic monomer, for example, acrylic acid, methacrylic acid, or maleic acid may be mentioned.

The acid value of the dispersant described above is preferably 50 to 550 mgKOH/g. In addition, the weight average molecular weight of the dispersant described above is preferably 1,000 to 50,000. In addition, as a mass ratio (pigment:dispersant) of the pigment to the dispersant is preferably in a range of 1:0.1 to 1:3.

In addition, without using the dispersant, a so-called self-dispersing pigment dispersible by reforming of the surface thereof may also be preferably used in the present invention.

(c) Resin Particles

The ink to be applied to the present invention may contain various types of particles. Among the particles, resin particles are preferable since the effect of improving image quality and/or fixing property may be obtained in some cases. In addition, the resin particles contained in the ink preferably has a low glass transition temperature as compared to a temperature of an image (ink image) heated by the fine irregular layer forming means. Since the glass transition temperature of the resin particles is in the range described above, when heat and pressure are applied by the fine irregular layer forming means, the resin particles contained in the color material layer of the printed material function to disperse the pressure, and as a result, the fine irregular layer according to the present invention can be easily formed.

A material of the resin particles usable in the present invention is not particularly limited, and a known resin may be appropriately used. In particular, for example, there may be mentioned a homopolymer, such as a polyolefin, a polystyrene, a polyurethane, a polyester, a polyether, a polyurea, a polyamide, a poly(vinyl alcohol), a poly(meth) acrylic acid and its salt, an alkyl poly(meth)acrylate, or a polydiene; or a copolymer obtained by polymerization using at least two monomers which generate the homopolymers mentioned above. The weight average molecular weight (Mw) of the resin is preferably in a range of 1,000 to 2,000,000. In addition, the amount of the resin particles in the ink with respect to the total mass thereof is preferably 1 to 50 percent by mass and more preferably 2 to 40 percent by mass.

Furthermore, in the aspect of the present invention, a resin particle dispersion in which the resin particles described above are dispersed in a liquid is preferably used. A dispersing method is not particularly limited, and a so-called self-dispersing resin particle dispersion in which a resin obtained by homopolymerization of a monomer having a dissociable group or by copolymerization of a plurality of monomers is dispersed is preferable. In this case, as the dissociable group, for example, a carboxyl group, a sulfonic acid group, a phosphoric acid group may be mentioned, and as a monomer having this dissociable group, for example, acrylic acid or methacrylic acid may be mentioned. In addition, as is the case described above, a so-called emulsion dispersing resin particle dispersion in which resin particles are dispersed by an emulsifier may also be preferably used. As the emulsifier described above, a known surfactant is preferably used regardless of whether the molecular weight thereof is low or high. The surfactant described above is preferably a nonionic surfactant or a surfactant having the same charge as that of resin particles.

The resin particle dispersion used in the aspect of the present invention preferably has a dispersing particle diameter of 10 to 1,000 nm and more preferably has a dispersing particle diameter of 100 to 500 nm.

When the resin particle dispersion used in the aspect of the present invention is formed, in order to stabilize the dispersion, various types of additives are preferably added thereto. As the various additives, for example, n-hexadecane, dodecyl methacrylate, stearyl methacrylate, chlorobenzene, dodecyl mercaptan, a blue dye, or a poly(methyl methacrylate) is preferable.

(d) Surfactant

The ink usable in the present invention may contain a surfactant. As the surfactant, in particular, for example, an acetylene glycol ethylene oxide adduct (Acetylenol E100, manufactured by Kawaken Fine Chemicals Co., Ltd.) may be mentioned. The amount of the surfactant in the ink with respect to the total mass thereof is preferably 0.01 to 5.0 percent by mass.

(e) Water and Water-Soluble Organic Solvent

The ink to be used in the present invention may contain as a solvent, water and/or a water-soluble organic solvent. The water is preferably water deionized by ion-exchange or the like. In addition, the content of the water in the ink with respect to total mass thereof is preferably 30 to 97 percent by mass.

In addition, the type of water-soluble organic solvent is not particularly limited, and any known water-soluble organic solvent may be used. In particular, for example, there may be mentioned glycerin, diethylene glycol, polyethylene glycol, polypropylene glycol, ethylene glycol, propylene glycol, butylene glycol, triethylene glycol, thiodiglycol, hexylene glycol, ethylene glycol monomethyl ether, diethylene glycol monomethyl ether, 2-pyrrolidone, ethanol, or methanol. Of course, at least two solvents selected from those mentioned above may be used by mixing.

In addition, the content of the water-soluble solvent in the ink with respect to the total mass thereof is preferably 3 to 70 percent by mass.

(f) Other Additives

The ink usable in the present invention may contain, besides the above components, if needed, various additives, such as a pH adjuster, an antirust agent, an antiseptic, a fungicide, an antioxidant, an anti-reducing agent, a water-soluble resin and its neutralizing agent, and a viscosity adjuster.

<Auxiliary Liquid and First Auxiliary Liquid>

The auxiliary liquid of the first aspect and the first auxiliary liquid of the second aspect each contain spherical particles. As the spherical particles, various resin particles may be used. A material of the resin particles is not particularly limited, and a known resin may be appropriately used. In particular, for example, there may be mentioned a homopolymer, such as a polyolefin, a polystyrene, a polyurethane, a polyester, a polyether, a polyurea, a polyamide, a poly(vinyl alcohol), a poly(meth)acrylic acid and its salt, an alkyl poly(meth)acrylate, or a polydiene; or a copolymer obtained by polymerization using at least two monomers which generate the homopolymers mentioned above. The weight average molecular weight (Mw) of the resin is preferably in a range of 1,000 to 2,000,000. In addition, the amounts of the resin particles in the auxiliary liquid and the first auxiliary liquid with respect to the total mass of the auxiliary liquid and the total mass of the first auxiliary liquid are each preferably 1 to 50 percent by mass and more preferably 2 to 20 percent by mass. In addition, the glass transition temperature or the melting point of the spherical particles is preferably higher than the glass transition temperature or the melting point of the resin particles contained in the ink.

Furthermore, in the aspect of the present invention, a resin particle dispersion in which the resin particles are dispersed in a liquid is preferably used. A dispersing method is not particularly limited, and a so-called self-dispersing resin particle dispersion in which a resin obtained by homopolymerization or copolymerization using at least one monomer having a dissociable group is dispersed is preferable. In this case, as the dissociable group, for example, a carboxyl group, a sulfonic acid group, or a phosphoric acid group may be mentioned, and as a monomer having this dissociable group, for example, acrylic acid or methacrylic acid may be mentioned. In addition, as is the case described above, a so-called emulsion dispersing resin particle dispersion in which resin particles are dispersed by an emulsifier may also preferably used. As the emulsifier described above, a known surfactant is preferably used regardless of whether the molecular weight thereof is low or high. The surfactant described above is preferably a nonionic surfactant or a surfactant having the same charge as that of resin particles.

In view of effective decrease in refractive index and haze suppression, the dispersing particle diameter of the resin particle dispersion used in the aspect of the present invention is preferably 110 to 400 nm and more preferably 110 to 300 nm.

In addition, the auxiliary liquid and the first auxiliary liquid each preferably contain, besides spherical particles for reflection suppression, resin particles (also called binding-resin resin particles) having a melting temperature or a softening temperature lower than that of the spherical particles for reflection suppression.

When the resin particle dispersion is used as a binding resin contained in the fine irregular layer, in order to effectively fill interparticle voids, the average particle diameter of the binding-resin resin particles is preferably smaller than that of the spherical particles. In particular, the average particle diameter is preferably 0.2 to 0.5 times the average particle diameter of the spherical particles for reflection suppression.

A mixing rate of the types of resin particles of each of the spherical particles for reflection suppression and the binding-resin resin particles is preferably set to 70 to 95 percent by mass of the largest particles to 5 to 30 percent by mass of the smallest particles.

In addition, in view of coloration suppression and haze suppression, the average particle diameter of spherical particles (hereinafter, also referred to as "largest particles" in some cases) having the largest average particle diameter is preferably 110 to 400 nm and more preferably 110 to 300 nm. In addition, the average particle diameter of spherical particles (hereinafter, also referred to as "smallest particles" in some cases) having the smallest average particle diameter is preferably 0.25 to 0.5 times the average particle diameter of the spherical particles having the largest average particle diameter. In addition, in the auxiliary liquid and the first auxiliary liquid, with respect to the total amount of the spherical particles contained in the auxiliary liquid, the rate of spherical particles having the largest average particle diameter is preferably 60 to 95 percent by volume, and the rate of the particles having the smallest average particle diameter is preferably 5 to 40 percent by volume.

In addition, the two types of auxiliary liquids each are not required to contain only the large particles or the small particles and may contain plural types of particles mixed with each other. However, since the void rate of the fine irregular layer is required to be changed in a stepwise manner, the auxiliary liquid application means 207 and 307 close to the ink application means 203 and 303 are required to handle relatively a large amount of spherical particles having a large particle diameter as compared to that of the auxiliary liquid application means 247 and 347, respectively.

In addition, when the resin particle dispersion used in the aspect of the present invention is formed, for stabilization, various additives are also preferably added. As the additives, for example, n-hexadecane, dodecyl methacrylate, stearyl methacrylate, chlorobenzene, dodecyl mercaptan, a blue dye, or a poly(methyl methacrylate) is preferable.

In addition, in order to effectively decrease the average refractive index, a dispersion or an aggregate of hollow particles may also be used for the spherical particles for reflection suppression. In particular, there may be mentioned an aggregate of porous silica particles selected from Nipsil and Nipgel, trade name manufactured by Nippon Silica Industries Co., Ltd., and Colloidal Silica UP Series, trade name manufactured by Nissan Chemical Corporation, having the structure in which silica particles are connected in the form of a chain. The average particle diameter of the particles having voids is preferably 110 to 300 nm in view of effective decrease in reflectance and haze suppression.

<Second Auxiliary Liquid>

In the image recording apparatus of the second aspect, the second auxiliary liquid is preferably used. A second auxiliary liquid containing a water-soluble resin to be used as a binder in an image is applied on the transfer member. Accordingly, the adhesion of the intermediate image to the recording medium is improved, and the transfer property and the abrasion resistance (fixing property) of a final image after the transfer can be improved. Although the auxiliary liquid may be either aqueous or non-aqueous, a water-soluble resin is contained. The "water-soluble resin" in this case indicates a compound having a solubility larger than 0 g in 100 g of water. In addition, the water-soluble resin may be a resin reactable with the reaction liquid.

Although the type of water-soluble resin for auxiliary liquid is not particularly limited as long as a target binder function can be obtained in an image, in accordance with the type of auxiliary liquid application means, the type of water-soluble resin is preferably changed. For example, in the case in which the auxiliary liquid application means is a recording head, the weight average molecular weight of the water-soluble resin is preferably 2,000 to 10,000 and more preferably 5,000 to 10,000. In addition, in the case of a roller coating means, a water-soluble resin having a weight average molecular weight larger than that described above can be used. The glass transition temperature (Tg) of the water-soluble resin is preferably 40° C. to 120° C.

As the water-soluble resin as described above, in particular, for example, although there may be mentioned a block copolymer, a random copolymer, a graft copolymer, or salts thereof, each of which is formed from at least two monomers (at least one of them is a hydrophilic polymerizable monomer) selected from styrene (Tg=100° C.), a styrene derivative, vinylnaphthalene (Tg=159° C.), a vinylnaphthalene derivative, an aliphatic alcohol ester of an $\alpha,\beta$-ethylenic unsaturated carboxylic acid, acrylic acid, an acrylic acid derivative, maleic acid, a maleic acid derivative, itaconic acid, an itaconic acid derivative, fumaric acid, a fumaric acid derivative, vinyl acetate, vinyl alcohol, vinyl pyrrolidone, acrylamide, and derivatives thereof, in particular, a block copolymer or a random copolymer formed from at least two monomers (at least one of them is a hydrophilic polymerizable monomer) selected from styrene, acrylic acid, an acrylic acid derivative, and methacrylic acid is preferable. In addition, natural resins, such as rosin, shellac, and starch, may also be preferably used. Those water-soluble resins are each an alkaline soluble resin soluble in an aqueous solution in which a base is dissolved.

In addition, the content of the water-soluble resin mentioned above in the second auxiliary liquid with respect to the total mass of the auxiliary liquid is preferably in a range of 0.1 to 20 percent by mass and more preferably 0.1 to 10 percent by mass. The surface tension of the second auxiliary liquid is preferably lower than the surface tension of the ink. Accordingly, the second auxiliary liquid spreads on the transfer member, and hence, a contact property to the ink can be improved. The second auxiliary liquid preferably contains resin particles. In this case, the second auxiliary liquid may contain resin particles similar to the resin particles contained in the ink. Accordingly, movement suppression on the transfer member of the ink applied thereon and the image toughness on the recording medium can be improved. In addition, the amount of the second auxiliary liquid applied to the intermediate image is preferably in a range of 0.1 to 50 times the amount of the ink applied on the transfer member and more preferably in a range of 0.5 to 25 times the amount the ink.

3. Image Recording Method

In an image recording method of the first aspect, after the reaction liquid is applied on the recording medium, the ink is applied to the reaction liquid on the recording medium. Next, the auxiliary liquid is applied to the reaction liquid and the ink on the recording medium. Subsequently, a region to which the auxiliary liquid is applied is treated, so that an image including the fine irregular layer as an outermost layer is formed.

In an image recording method of the second aspect, after the reaction liquid is applied on the transfer member, the auxiliary liquid is applied to the reaction liquid on the transfer member. Next, the ink is applied to the reaction liquid and the auxiliary liquid on the transfer member.

Subsequently, the intermediate image on the transfer member is transferred to the recording medium. Next, a region to which the auxiliary liquid is applied is treated, so that an image including the fine irregular layer as an outermost layer is formed.

In addition, in the first aspect and the second aspect, the regions to which the reaction liquid and the ink are applied may be partially overlapped with each other. In addition, the auxiliary liquid may be applied to at least a mixture in which the reaction liquid and the ink are mixed with each other.

The image clarity of the printed material can be measured by an image clarity measurement device. The printed material according to the present invention has an image definition C(2) (%) of 50% or more at an optical comb width of 2 mm. When the image definition C(2) is 50% or more, it is judged that a clear image is obtained. In addition, the image definition C(2) is preferably 70% or more, more preferably 80% or more, and particularly preferable 90% or more. In addition, the upper limit of the image definition C(2) (%) is 100%.

A reflected light intensity of the printed material can be measured by a 20° gloss meter. When the 20° gloss value is 70 or less, it is judged that the reflection suppression effect can be obtained.

In addition, an irregular shape of the fine irregular layer can be measured by a scanning electron microscope. The height of a convex portion of this embodiment is a height between the topmost portion and the bottommost portion of the surface of the fine irregular layer in a vertical cross-sectional direction. In this embodiment, by observation of the vertical cross-sectional surface of the irregularity using a scanning electron microscope, the heights of 20 convex portions are measured, and the average value of the measurement values thus obtained is regarded as the average height of the convex portions of the present invention.

For measurement of the refractive index of the surface of the printed material, a spectro-ellipsometer is used.

The haze is measured by a haze meter, and when the measured value is 20 or less, it is judged that no haze is present.

In addition, in view of suppression in light reflection, the average refractive index of the fine irregular layer of the printed material of the present invention is preferably 1.48 or less. In addition, in this specification, the average refractive index is a volume average refractive index unless otherwise particularly noted.

Hereinafter, as for steps of the image recording method of this embodiment, the first aspect and the second aspect will be described in this order.

(First Aspect)
<Step of Applying Reaction Liquid>

A method for applying the reaction liquid to the surface of the recording medium can be performed by appropriately using various techniques which have been known in the past. As an example, for example, there may be mentioned die coating, blade coating, a technique using a gravure roller, a technique using an offset roller, or a spray coating. In addition, a method for applying a reaction liquid using an ink jet device is also preferable. Furthermore, the techniques mentioned above may be preferably used in combination.

<Step of Applying Ink>

Subsequently, the ink is applied to the surface of the recording medium to which the reaction liquid is applied. Although the method for applying the ink is not particularly limited, the ink is preferably applied using an ink jet device.

As the ink jet device applied to this embodiment, for example, an ink jet device having the following structure may be used.

Structure in which film boiling is generated in an ink by an electrothermal transducer to form air bubbles, so that the ink is ejected.

structure in which an ink is ejected by an electromechanical transducer.

Structure in which an ink is ejected using static electricity.

In addition, besides the structures described above, various types of ink jet devices proposed in ink jet liquid ejection techniques each may also be used. Among those ink jet devices, in particular, an ink jet device using an electrothermal transducer is preferably used in view of high speed and high density printing.

In addition, the structure of the entire ink jet device is not particularly limited. For example, a so-called shuttle-type ink jet head may be used in which recording is performed while a head is scanned in a direction orthogonal to a traveling direction of a recording medium. In addition, a so-called line head-type ink jet head may also be used in which ink ejection ports are disposed in the form of a line approximately orthogonal (that is, approximately parallel to a shaft direction in the case of a drum shape) to a traveling direction of a recording medium.

Although the properties of the ink are not particularly limited as long as the advantages of the present invention are not impaired, the surface tension of the ink is preferably 20 to 50 mN/m.

In addition, in the step of applying the ink, to a region on the recording medium to which the ink containing a color material is not applied, a clear ink containing no color material may be applied.

<Step of Applying Auxiliary Liquid>

To the surface of the recording medium to which the reaction liquid and the ink are applied, the auxiliary liquid is applied. Although a method for applying the auxiliary liquid is not particularly limited, as is the case of the application of the ink, the auxiliary liquid is preferably applied using an ink jet device. Accordingly, on the recording medium, an image is formed from the reaction liquid, the ink, and the auxiliary liquid.

Although the properties of the auxiliary liquid are not particularly limited as long as the advantages of the present invention are not impaired, the surface tension of the auxiliary liquid is preferably 20 to 50 mN/m.

In addition, in a step of applying the auxiliary liquid, the spherical particles may be applied to the region to which the ink is applied either in a contact manner or in a non-contact manner.

<Step of Removing Liquid Component>

In this embodiment, a step of decreasing a liquid component from the image formed on the recording medium is preferably provided. In this step of removing a liquid component, since an excess liquid component in the image is removed, for example, feathering in which the ink spreads along fibers of the recording medium is prevented, and hence, a preferable final image can be obtained. As a technique of removing a liquid component, any one of various techniques which have been used in the past may be preferably used. For example, there may be preferably used any one of a heating method, a method for blowing low humid air, a method for reducing the pressure, a method for placing an absorber in a contact state, or a technique using those methods mentioned above in combination. In addition, by spontaneous drying, the liquid component may also be removed.

<Step of Forming Fine Irregular Layer>

To the image formed on the recording medium, the fine irregular layer is formed on the surface of the image using the fine irregular layer forming means. A method for forming the fine irregular layer is not particularly limited as long as treatment can be performed so that the surface of the printed material to be formed has convex portions having an average particle diameter of 0.04 to 0.15 µm and an image definition C(2) of the image of 50% or more at an optical comb width of 2 mm. In particular, as a method for forming the printed material having the fine irregular layer, the recording medium on which image recording is performed is preferably pressurized by a pressure application member, such as a roller. In addition, the recording medium is also preferably heated. Furthermore, by simultaneously performing pressure application and heat application using a heating roller, the fine irregular layer may also be formed. In addition, by evaporation of a volatile component contained in the auxiliary liquid, the fine irregular layer may also be formed. In addition, in a step of forming the fine irregular layer, after the image on the recording medium is heated and pressurized, peeling of the image is preferably performed by cooling since the control can be easily performed so that the convex portions having an average height of 0.04 to 0.15 µm are formed on the surface of the fine irregular layer, and the image definition C(2) of the image at an optical comb width of 2 mm is 50% or more.

The fine irregular layer forming means preferably includes a heat/pressure application member, a belt member, and a cooling device. As the heat/pressure application member, an appropriate selection may be performed in accordance with the purpose, and for example, a pair of heating rollers or a combination of a heating roller and a pressure roller may be mentioned.

Although the cooling device is not particularly limited and may be appropriately selected in accordance with the purpose, for example, there may be used a cooling device capable of sending cool air or adjusting a cooling temperature or the like, a heat sink, and the like.

In addition, the fine irregular layer forming means includes a peeling portion peeling the image from the belt member. Although the peeling portion is not particularly limited and may be appropriately selected in accordance with the purpose, for example, a position in the vicinity of a tension roller at which peeling is performed from the belt by the rigidity of the recording medium may be mentioned.

The pressure application is preferably performed when the image on the recording medium is brought into contact with the pressure application member of the fine irregular layer forming means. Although a method of this pressure application is not particularly limited and may be appropriately selected in accordance with the purpose, a nip pressure is preferably used. Since the surface of the fine irregular layer according to the present invention is easily formed, the nip pressure is preferably 1 to 30 kg/cm$^2$ and more preferably 3 to 20 kg/cm$^2$. In addition, when the pressure application member is a pressure/heat application member, a heating temperature of the pressure/heat application member is preferably a temperature at which a surface temperature of the belt member does not soften the spherical particles and softens the resin used as a binder in the fine irregular layer and/or the color material layer, and although being changed in accordance with the spherical particles to be used or the resin used as a binder, the temperature is preferably, in general, 60° C. to 250° C. In addition, the surface temperature of the belt member to be heated by the heat/pressure application member is preferably a temperature less than the softening point of the spherical particles forming the fine irregular layer. As for the cooling temperature in the cooling device, the surface temperature of the belt member is preferably a temperature of 100° C. or less at which the fine irregular layer and the ink layer (color material layer) are sufficiently solidified and is more preferably a temperature of 40° C. to 80° C. In addition, the surface temperature of the belt member can be adjusted not only by adjusting the temperature of the heat/pressure application member and/or the cooling device but also by changing the material of the belt member and/or the moving rate thereof.

The belt member is preferably a film having a mold-releasing property and a heat resistance. As a material of the film used for the belt member, a resin, such as a polyimide, or a metal, such as stainless steel or aluminum, may be mentioned. Among those mentioned above, a polyimide is particularly preferable.

Since a surface including convex portions having a specific height defined by the present invention is formed in the fine irregular layer, a surface of the belt member at a side in contact with the image on the recording medium preferably has an arithmetic surface roughness Ra of 10 to 150 nm and more preferably 20 to 100 nm.

(Second Aspect)

<Step of Applying Reaction Liquid>

A method for applying the reaction liquid to the surface of the transfer member can be performed by appropriately using various techniques which have been known in the past. As an example, for example, there may be mentioned die coating, blade coating, a technique using a gravure roller, a technique using an offset roller, or a spray coating. In addition, a method for applying the reaction liquid using an ink jet device is also preferable. Furthermore, the techniques mentioned above may be preferably used in combination.

<Step of Applying First Auxiliary Liquid>

To the surface of the transfer member to which the reaction liquid is applied, the first auxiliary liquid is applied. Although a method for applying the first auxiliary liquid is not particularly limited, the first auxiliary liquid is preferably applied using an ink jet device.

As the ink jet device applied to this embodiment, for example, an ink jet device having the following structure may be used.

Structure in which film boiling is generated in an ink by an electrothermal transducer to form air bubbles, so that the ink is ejected.

structure in which an ink is ejected by an electromechanical transducer.

Structure in which an ink is ejected using static electricity.

In addition, besides the structures described above, various types of ink jet devices proposed in ink jet liquid ejection techniques each may also be used. Among those ink jet devices, in particular, an ink jet device using an electrothermal transducer is preferably used in view of high speed and high density printing.

In addition, the structure of the entire ink jet device is not particularly limited. For example, a so-called shuttle-type ink jet head may be used in which recording is performed while a head is scanned in a direction orthogonal to a traveling direction of a transfer member. In addition, a so-called line head-type ink jet head may also be used in which ink ejection ports are disposed in the form of a line approximately orthogonal (that is, approximately parallel to a shaft direction in the case of a drum shape) to a traveling direction of a transfer member.

Although the properties of the first auxiliary liquid are not particularly limited as long as the advantages of the present invention are not impaired, the surface tension of the first auxiliary liquid is preferably 20 to 50 mN/m.

In addition, in the step of applying the first auxiliary liquid, the spherical particles may be applied to a region to which the ink is applied either in a contact manner or in a non-contact manner.

<Step of Applying Ink>

Subsequently, the ink is applied to the surface of the transfer member to which the reaction liquid and the first auxiliary liquid are applied. Although a method for applying the ink is not particularly limited, as is the case of the application of the first auxiliary liquid, the ink is preferably applied using an ink jet device.

Although the properties of the ink are not particularly limited as long as the advantages of the present invention are not impaired, the surface tension of the ink is preferably 20 to 50 mN/m.

In addition, in the step of applying the ink, to a region on the transfer member to which the ink containing a color material is not applied, a clear ink containing no color material may be applied.

<Step of Applying Second Auxiliary Liquid>

In this embodiment, on the reaction liquid, the first auxiliary liquid, and the ink applied on the transfer member, the second auxiliary liquid containing the water-soluble resin is preferably applied. Although a method for applying the second auxiliary liquid is not particularly limited, as is the case of the application of the ink, the second auxiliary liquid is preferably applied using an ink jet device. Accordingly, the intermediate image is formed on the transfer member from the reaction liquid, the first auxiliary liquid, the ink, and the second auxiliary liquid.

Although the properties of the auxiliary liquid are not particularly limited as long as the advantages of the present invention are not impaired, the surface tension of the auxiliary liquid is preferably 20 to 50 mN/m.

<Step of Removing Liquid Component>

In this embodiment, a step of decreasing a liquid component from the intermediate image formed on the transfer member is preferably provided. In this step of removing a liquid component, since an excess liquid component in the intermediate image is removed, the excess liquid component can be prevented from protruding in a transfer step, and a preferable final image can be obtained. As a technique of removing a liquid component, any one of various techniques which have been used in the past may be preferably used. For example, there may be preferably used any one of a technique by heating, a technique of blowing low humid air, a technique of reducing the pressure, a technique of placing an absorber in a contact state, or a technique using those techniques mentioned above in combination. In addition, by spontaneous drying, the liquid component may also be removed. In addition, as described below, when the liquid component is removed by heating, the transfer member is heated by this heating, and as a result, the transfer member is heated to a temperature equivalent to or more than the glass transition temperature of the water-soluble resin in some cases. In this case, a heating means for performing the removal of the liquid component also functions as a temperature adjustment means in some cases.

<Transfer Step of Intermediate Image>

In the transfer step, the intermediate image on the transfer member is transferred onto the recording medium. Although a method for transferring the intermediate image is not particularly limited, for example, the transfer member and the recording medium are pressed to each other with pressure, so that the intermediate image on the transfer member is transferred to the recording medium. Although a technique of pressing the transfer member and the recording medium to each other with pressure is not particularly limited, it is preferable that after a pressure roller is disposed so as to be in contact with the outer circumference surface of the transfer member, the recording medium is allowed to pass between the transfer member and the pressure roller. As described above, when the intermediate image is pressurized from two sides of the transfer member and the recording medium, the intermediate image is efficiently formed by the transfer. In addition, as shown in FIG. 7, when the second auxiliary liquid is used in order to improve the transfer property, in the transfer step, the temperature of the transfer member is set to a first temperature (Tc) equivalent to or more than the glass transition temperature of the water-soluble resin, and the temperature of the recording medium is set to a second temperature (Tr) less than the glass transition temperature of the water-soluble resin. In addition, under the temperature conditions described above, the intermediate image is transferred from the transfer member to the recording medium. In addition, since an effect of reducing transfer defects can be obtained, in the transfer step, a multi-stage pressure application is preferably performed. In this case, a multi-stage arrangement is used in which a temperature at which the intermediate image is peeled away from the transfer member at the final stage is set to Tr.

In addition, the glass transition temperature of the water-soluble resin can be measured by a differential scanning calorimetry analysis device.

<Fine Irregularity Forming Step>

A fine irregularity forming step is the same as a fine irregularity forming step described in the above first aspect, and hence, description thereof is omitted.

EXAMPLES

Hereinafter, examples of the present invention will be described with reference to the drawings. The present invention is not limited to the following examples as long as not departing from the scope of the present invention. In addition, in the following examples, "part(s)" is on the mass basis unless otherwise particularly noted.

Example 1-1

Image recording was performed using the image recording apparatus shown in FIG. 5. In this example, as a recording medium, Gloria Pure White Paper (manufactured by Gojo Paper MFG Co., Ltd., basis weight: 210.0 g/m$^2$) was used. In addition, in an application step of an ink and an auxiliary liquid, a line head-type ink jet head was used.

A reaction liquid, an ink, and an auxiliary liquid used for the apparatus shown in FIG. 5 were prepared as described below. In addition, the glass transition temperatures of spherical particles and a resin were each measured using a differential scanning calorimetry analysis device (manufactured by Mettler Toledo International Inc., DSC822e).

(Preparation of Reaction Liquid)

After 21.0 parts of glutaric acid, 5 parts of glycerin, 5 parts of a surfactant (Megafac F444, manufactured by DIC Corporation), and the balance ion exchanged water were mixed and then sufficiently stirred, pressure filtration was performed using a microfilter (manufactured by Fujifilm Corporation) having a pore size of 3.0 μm. As a result, a reaction liquid was prepared.

(Preparation of Black Pigment Dispersion Liquid)

First, 10 parts of carbon black (trade name: Monarch 1100, manufactured by Cabot Corporation), 15 parts of a pigment dispersant aqueous solution (styrene-ethyl acrylate-acrylic acid copolymer (acid value: 150, weight average molecular weight: 8,000); solid component: 20%; neutralized with potassium hydroxide), and 75 parts of pure water were mixed together. After this mixture was charged in a batch-type vertical sand mill (manufactured by Imex Co., Ltd.), 200 parts of zirconia beads having a diameter of 0.3 mm were charged, and while water cooling was performed for 5 hours, a dispersing treatment was performed. This dispersion liquid was treated by a centrifugal machine to remove coarse and large particles, so that a black pigment dispersion liquid having a pigment concentration of approximately 10% was obtained.

(Preparation of Ink Resin Particle Dispersion)

After 20 parts of ethyl methacrylate, 3 parts of 2,2'-azobis-(2-methylbutyronitrile), and 2 parts of n-hexadecane were mixed together, stirring was performed for 0.5 hours. This mixture was dripped to 75 parts of an 8%-aqueous solution of a styrene-butyl acrylate-acrylic acid copolymer (acid value: 130 mgKOH/g, weight average molecular weight (Mw): 7,000) and was stirred for 0.5 hours. Next, ultrasonic waves were irradiated for 3 hours using an ultrasonic wave irradiation machine. Subsequently, after a polymerization reaction was performed at 80° C. for 4 hours in a nitrogen atmosphere, cooling was performed at room temperature, and filtration was then performed, so that a resin particle dispersion (glass transition temperature: 90° C.) having a resin content of 25.0 percent by mass was obtained. The glass transition temperature of ink resin particles was measured by a differential scanning calorimetry analysis device (manufactured by Mettler Toledo International Inc., DSC822e).

(Preparation of Ink)

After 40 parts of the above black pigment dispersion liquid, 20 parts of the ink resin particle dispersion, 7 parts of glycerin, 3 parts of a poly(ethylene glycol) (number average molecular weight (Mn): 1,000), 0.5 parts of a surfactant (Acetylenol E100, manufactured by Kawaken Fine Chemicals Co., Ltd.), and the balance ion exchanged water were mixed together, sufficient stirring was performed. Subsequently, pressure filtration was performed on this mixture using a microfilter (manufactured by Fujifilm Corporation) having a pore size of 3.0 μm, so that an ink (surface tension: 35 mN/m) was prepared. The surface tension of the ink was measured by an automatic surface tension meter (DY-300, manufactured by Kyowa Interface Science Co., Ltd.).

(Preparation of Auxiliary Liquid Resin Particle Dispersion)

As an auxiliary liquid resin particle dispersion, by adjusting the polymerization time to prepare the ink resin particle dispersion, a dispersion containing resin particles having an average particle diameter of 198 nm and a glass transition temperature of 90° C. was obtained. The measurement of the average particle diameter of the resin particles was performed using a scanning electron microscope (manufactured by Hitachi High-Technologies Corporation, S-4800), and a peak of a particle size distribution of 20 particles was regarded as the average particle diameter of the particle diameters. The average particle diameter thus measured was a volume average particle diameter (d50). In addition, the measurement of the glass transition temperature was performed using a differential scanning calorimetry analysis device (manufactured by Mettler Toledo International Inc., DSC822e). In particular, after 10 mg of a water-soluble resin was fractionated in an aluminum crucible, a temperature cycle (temperature rise rate: 2° C./min) was performed twice from 30° C. to 120° C. in a nitrogen atmosphere (20 ml/min) using the differential scanning calorimetry analysis device described above.

(Preparation of Auxiliary Liquid)

After 10 parts of the above auxiliary liquid resin particle dispersion, 3 parts of a water-soluble resin (styrene-butyl acrylate-acrylic acid copolymer (acid value: 132, weight average molecular weight: 7,700, glass transition temperature: 78° C.); solid component: 20%; neutralized with potassium hydroxide), 7 parts of glycerin, 3 parts of a poly (ethylene glycol) (number average molecular weight (Mn): 1,000), 0.5 parts of a surfactant (Acetylenol E100, manufactured by Kawaken Fine Chemicals Co., Ltd.), and the balance ion exchanged water were mixed together, sufficient stirring was performed. Subsequently, pressure filtration was performed on this mixture using a microfilter (manufactured by Fujifilm Corporation) having a pore size of 3.0 μm, so that an auxiliary liquid (surface tension: 35 mN/m) was prepared. The surface tension of the auxiliary liquid was measured by an automatic surface tension meter (DY-300, manufactured by Kyowa Interface Science Co., Ltd.).

(Image Recording)

In this example, by the use of the image recording apparatus shown in FIG. 5, image recording was performed as described below. First, from the roller type coating device 205, the reaction liquid prepared as described above was applied on the recording medium 201. Subsequently, from the ink jet devices 203 and 207, the ink and the auxiliary liquid prepared as described above were ejected, respectively, on the recording medium 201 so that a coverage of an ink image by the auxiliary liquid is 100%. Accordingly, a recorded image was formed. The ink image thus formed was a solid black image having a size of 25 mm by 100 mm. In addition, this solid black image was formed by application of the ink at 24 ng/600 dpi. Next, by the blower device 210, a liquid component was removed from the recorded image on the recording medium 201. Subsequently, by the fine irregular layer forming means 216, a fine irregular layer was formed at the surface of the recorded image. As a fixing substrate (belt member) 222 of this fine irregular layer forming means 216, a polyimide film (trade name: Kapton, manufactured by Du Pont-Toray Co., Ltd.) was used. The image definition C(2) of the surface of this belt member at a side in contact with the image on the recording medium was 97%, and an arithmetic surface roughness Ra was 70 nm. The arithmetic surface roughness Ra of the surface of the belt member was measured using a surface roughness measurement device (trade name: Surftest SJ-210).

By the use of the pressure roller 218 having a surface temperature of 150° C. set by the heating heater 217, a pressure loading of 15 kg/cm$^2$ was performed. In addition, a transport rate of the recording medium 201 when the medium was allowed to pass through this fine irregular layer forming means 216 was set to 0.5 m/sec. In addition, a moving rate of the belt member was adjusted so as to be approximately the same as this transport rate of the recording medium. In this case, the surface temperature of the belt member heated by the heated pressure roller was 150° C. In addition, the surface temperature of the image in contact with the belt member thus heated was 70° C. Furthermore, since the surface of the belt member was cooled to 25° C. by a blower fan in the cooling portions (cooling device) 219, the recording medium and the recorded image were cooled to 25° C. Subsequently, the fixing substrate 222 was peeled away by the peeling roller 220, so that a final image was obtained. In addition, the temperatures of the surface of the heating heater and the surfaces of the recording medium and the recorded image were each measured by an infrared radiation thermometer.

Example 1-2

Since the polymerization time to prepare the auxiliary liquid resin particle dispersion and the monomer ratio to obtain the resin particles were changed, an auxiliary liquid resin particle dispersion having an average particle diameter of 300 nm and a glass transition temperature of 85° C. was obtained. Except for that this auxiliary liquid resin particle dispersion was used, image formation was performed in a manner similar to that of Example 1-1.

Example 1-3

Since the polymerization time to prepare the auxiliary liquid resin particle dispersion and the monomer ratio to obtain the resin particles were changed, an auxiliary liquid resin particle dispersion having an average particle diameter of 257 nm and a glass transition temperature of 82° C. was obtained. Except for that this auxiliary liquid resin particle dispersion was used, image formation was performed in a manner similar to that of Example 1-1.

Example 1-4

Since the polymerization time to prepare the auxiliary liquid resin particle dispersion and the monomer ratio to obtain the resin particles were changed, an auxiliary liquid resin particle dispersion having an average particle diameter of 198 nm and a glass transition temperature of 90° C. was obtained. Except for that this auxiliary liquid resin particle dispersion was used, image formation was performed in a manner similar to that of Example 1-1.

Example 1-5

Since the polymerization time to prepare the auxiliary liquid resin particle dispersion and the monomer ratio to obtain the resin particles were changed, an auxiliary liquid resin particle dispersion having an average particle diameter of 172 nm and a glass transition temperature of 100° C. was obtained. Except for that this auxiliary liquid resin particle dispersion was used, image formation was performed in a manner similar to that of Example 1-1.

Example 1-6

Except for that auxiliary liquid resin particles having an average particle diameter of 110 nm and a glass transition temperature of 85° C. were used by changing the polymerization time to prepare the auxiliary liquid resin particle dispersion and the monomer ratio to obtain the resin particles, image formation was performed in a manner similar to that of Example 1-1.

Example 1-7

Except for that an image coverage of the ink image by the auxiliary liquid was set to 90%, image formation was performed in a manner similar to that of Example 1-1.

Example 1-8

Except for that an image coverage of the ink image by the auxiliary liquid was set to 50%, image formation was performed in a manner similar to that of Example 1-1.

Example 1-9

Except for that the resin particles contained in the auxiliary liquid were changed to hollow nano silica (manufactured by Nittetsu Mining Co., Ltd, SiliNax SP-PN, particle diameter: 105 nm), image formation was performed in a manner similar to that of Example 1-1.

Example 1-10

Except for that the resin particles contained in the auxiliary liquid were changed to silica colloid (manufactured by Nissan Chemical Corporation, Snowtex MP-2040, particle diameter: 200 nm), image formation was performed in a manner similar to that of Example 1-1.

Example 1-11

Except for that the auxiliary liquid was applied by a bar coater instead of using the ink jet device, image formation was performed in a manner similar to that of Example 1-1.

Example 1-12

Except for that the monomer ratio to obtain the resin particles for preparing the auxiliary liquid resin particle dispersion was changed to set the glass transition temperature of the ink resin particles to 50° C., image formation was performed in a manner similar to that of Example 1-1.

Example 1-13

Except for that auxiliary liquid resin particles having an average particle diameter of 400 nm and a glass transition temperature of 90° C. were used by changing the polymerization time to prepare the auxiliary liquid resin particle dispersion and the monomer ratio to obtain the resin particles, image formation was performed in a manner similar to that of Example 1-1.

Example 1-14

Image recording was performed using the image recording apparatus shown in FIG. 6. In addition, in this example, besides the rigidity and the dimensional accuracy withstanding against pressure application during the transfer, in consideration of required properties, such as reduction in inertia of the rotation to improve the response of control, as the support member 302, a cylindrical drum made of an aluminum alloy was used. As a material of the surface layer member 304, a sheet formed by coating a silicone rubber (manufactured by Shin-Etsu Chemical Co., Ltd., KE12) to have a thickness of 0.3 mm on a PET sheet having a thickness of 0.5 mm was used as an elastic layer of the transfer member. Furthermore, a mixture was formed from a condensate obtained by mixing glycidoxy propyl triethoxysilane and methyl triethoxysilane at a molar ratio of 1:1 followed by heat refluxing and a photo-cationic polymerization initiator (manufactured by ADEKA, SP150). After an atmospheric plasma treatment was performed so that a contact angle of water on the surface of the elastic layer was set to 10° or less, the mixture described above was applied on the surface of the elastic layer, and film formation was performed by UV irradiation and heat curing, so that the transfer member 301 was formed in which a surface layer having a thickness of 0.5 μm was formed on the elastic layer. The UV irradiation in this case was performed using a high-pressure mercury lamp at a cumulative exposure light amount of 5,000 mJ/cm$^2$, and the heat curing was performed at 150° C. for 2 hours.

The surface layer member 304 thus formed was used after fixed to the support member 302 by a double-sided adhesive tape. In this example, as the recording medium, Gloria Pure White Paper (Dojo Paper MFG Co., Ltd., basis weight: 210.0 g/m$^2$) was used as the recording medium.

A reaction liquid and an ink used in the apparatus shown in FIG. 6 were prepared in a manner similar to that for those used in the apparatus shown in FIG. 5, and hence, description thereof is omitted. Except for that, as a first auxiliary liquid, a dispersion containing resin particles having an average particle diameter of 198 nm and a glass transition temperature of 140° C. was used as the auxiliary liquid resin particle dispersion, an auxiliary liquid similar to that used in Example 1-1 was used.

In this example, image recording was performed as described below using the apparatus shown in FIG. 6. First, from the roller type coating device 305, the reaction liquid prepared as described above was applied on the transfer member 301. Subsequently, the first auxiliary liquid and the ink prepared as described above were ejected from the ink jet devices 303 and 307, respectively, on the transfer member 301. Accordingly, an intermediate image was formed. The intermediate image thus formed was a solid black image having a size of 25 mm by 100 mm. In addition, this solid black image was formed by application of the ink at 24 ng/600 dpi. Next, by the blower device 310, a liquid component was removed from the intermediate image on the transfer member 301, and at the same time, the transfer member 301 was heated by the heating heater 312 embedded in the transfer member 301. Subsequently, in the image transfer portion 331, in association with the rotation of the transfer member 301 in an arrow direction, the recording medium 308 and the intermediate image were brought into contact with each other between the transfer member 301 and the pressure roller 313, so that the intermediate image was transferred to the recording medium 308 from the transfer member 301. In this example, during the transfer, a first temperature of the transfer member 301 was set to 130° C., and a second temperature of the recording medium 308 was set to 100° C. In addition, the temperatures of the transfer member 301 and the recording medium 308 were each measured by an infrared radiation thermometer.

Example 1-15

Image recording was performed using the image recording apparatus shown in FIG. 7. In addition, since the ink jet device 411 applying a second auxiliary liquid was added, the apparatus of this example was different from the apparatus shown in FIG. 6.

A reaction liquid, an ink, and a first auxiliary liquid were prepared by a method similar to that of Example 1-1, and hence, description thereof is omitted. Hereinafter, a second auxiliary liquid will be described.
(Preparation of Second Auxiliary Liquid)

After 30 parts of a resin particle dispersion, 3 parts of a water-soluble resin (styrene-butyl acrylate-acrylic acid copolymer (acid value: 132, weight average molecular weight: 7,700, glass transition temperature: 78° C.); solid component: 20%; neutralized with potassium hydroxide), 7 parts of glycerin, 3 parts of a polyethylene glycol) (number average molecular weight (Mn): 1,000), 0.5 parts of a surfactant (Acetylenol E100, manufactured by Kawaken Fine Chemicals Co., Ltd.), and the balance ion exchanged water were mixed together, sufficient stirring was performed. Subsequently, pressure filtration was performed on this mixture using a microfilter (manufactured by Fujifilm Corporation) having a pore size of 3.0 μm, so that an auxiliary liquid (surface tension: 35 mN/m) was prepared. The surface tension of the auxiliary liquid was measured by an automatic surface tension meter (DY-300, manufactured by Kyowa Interface Science Co., Ltd.). In addition, the glass transition temperature of the water-soluble resin was measured by a differential scanning calorimetry analysis device (Mettler Toledo International Inc.).

In this example, image recording was performed as described below using the apparatus shown in FIG. 7. First, from the roller type coating device 305, the reaction liquid prepared as described above was applied on the transfer member 301. Subsequently, the first auxiliary liquid, the ink, and the second auxiliary liquid prepared as described above were ejected on the transfer member 301 from the ink jet devices 303, 307, and 411, respectively. Accordingly, an intermediate image was formed. Next, by the blower device 310, a liquid component was removed from the intermediate image on the transfer member 301, and at the same time, the transfer member 301 was heated by the heating heater 312 embedded in the transfer member 301. Subsequently, in the image transfer portion 331, in association with the rotation of the transfer member 301 in an arrow direction, the recording medium 308 and the intermediate image were brought into contact with each other between the transfer member 301 and the pressure roller 313, so that the intermediate image was transferred to the recording medium 308 from the transfer member 301. In this example, during the transfer, a first temperature of the transfer member 301 was set to 80° C., and a second temperature of the recording medium 308 was set to 25° C. In addition, the temperatures of the transfer member 301 and the recording medium 308 were each measured by an infrared radiation thermometer.

Example 1-16

A second auxiliary liquid containing a water-soluble resin (styrene-butyl methacrylate-acrylic acid copolymer (acid value: 87, weight average molecular weight: 9,300, glass transition temperature: 60° C.) having a glass transition temperature of 60° C. was used. In addition, during the transfer, the first temperature of the transfer member 301 and the second temperature of the recording medium 108 were set to 70° C. and 40° C., respectively. Except for those described above, image recording was performed in a manner similar to that of Example 1-15.

Example 1-17

Except for that image recording was performed using the image recording apparatus shown in FIG. 8, image recording was performed in a manner similar to that of Example 1-15.

Comparative Example 1-1

Except for that ion exchanged water was used instead of using the auxiliary liquid resin particle dispersion, image formation was performed in a manner similar to that of Example 1-1.

Comparative Example 1-2

Except for that auxiliary liquid resin particles having a glass transition temperature of 50° C. were used, image formation was performed in a manner similar to that of Example 1-1.

Comparative Example 1-3

Except for that auxiliary liquid resin particles having an average particle diameter of 420 nm and a glass transition temperature of 90° C. were used by changing the polymerization time to prepare the auxiliary liquid resin particle dispersion and the monomer ratio to obtain the resin particles, image formation was performed in a manner similar to that of Example 1-1.

Comparative Example 1-4

Except for that auxiliary liquid resin particles having an average particle diameter of 80 nm and a glass transition temperature of 85° C. were used by changing the polymerization time to prepare the auxiliary liquid resin particle dispersion and the monomer ratio to obtain the resin particles, image formation was performed in a manner similar to that of Example 1-1.

<Measurement of Transfer Rate of Intermediate Image>

In order to obtain transfer rates of Examples 1-14 to 1-17, from a rate of an area of the intermediate image on the transfer member before the transfer and an area of the intermediate image remaining on the transfer member after the transfer, the transfer rate of the intermediate image transferred on the recording medium was calculated. That is, the transfer member after the transfer step was observed using an optical microscope, a remaining area of the intermediate image was calculated, and the transfer rate to the recording medium was measured by calculating the equation: 100−(remaining area of intermediate image)/(area of intermediate image). The area of the intermediate image on the transfer member before the transfer and the area of the intermediate image remaining on the transfer member after the transfer were each measured at an objective lens magnification of 5 times in an observation area of 3 mm by 2 mm using an optical microscope (Axio Imager (manufactured by Carl Zeiss Microimaging Co., Ltd.).

<Evaluation of Glossiness>

The evaluation of glossiness was performed by the image clarity and reflected light intensity.

The image clarity was measured by an image clarity meter (manufactured by Suga Test Instruments Co., Ltd., ICM-1T), and when the image definition C(2) (%) is 50% to 100%, the surface was regarded as smooth.

The reflected light intensity was measured by a 20° gloss meter (manufactured by Nippon Denshoku Industries Co., Ltd., VG7000), and when the intensity was 70 or less, it was judged that a reflection suppression effect was obtained.

In addition, the refractive index of the surface of the printed material was measured at a wavelength of from 380 to 800 nm using a spectro-ellipsometer (M-2000, manufactured by J.A. Woollam Co., and a refractive index at a wavelength of 555 nm at which the photopic spectral luminous efficiency was highest was used.

The cloudiness (haze) of the image was measured using a haze meter (manufactured by BYK Gardner GmbH, microhaze plus). The evaluation criteria were as described below. In addition, a lower haze value indicates that the haze of the image is low.

A: Haze value is 10 or less.
B: Haze value is more than 10 to 20.
C: Haze value is more than 20.

<Evaluation of Abrasion>

The evaluation of abrasion was performed by a Gakushin-type dyeing friction fastness testing machine (manufactured by Yasuda Seiki Seisakusho, Ltd.). After 500 g of an abrasion test bar was provided with a cotton-cloth and was then moved on the image to and from 10 times, the glossiness was measured. When the differences in smoothness and the reflected light intensity before and after the evaluation were each less than 5, it was judged that the glossiness was not changed.

In the following Tables 1-1 to 1-4, the image clarity, the reflected light intensity, the haze of the image, and the like of each of Examples and Comparative Examples are shown. In Examples 1-1 to 1-17 in each of which the method of the present invention was used, a high image clarity, a low reflected light intensity, and no haze were obtained as the results. On the other hand, in Comparative Example 1-1, since no auxiliary liquid resin particles were contained in the auxiliary liquid, although a high image clarity and no haze could be obtained, the reflected light intensity was increased. In addition, in Comparative Example 1-2, although the auxiliary liquid resin particles were contained in the auxiliary liquid, since the temperature of the image during the formation of fine irregularity is higher than the glass transition temperature of the auxiliary liquid resin particles, the fine irregularity of the outermost layer was lost, and the reflected light intensity was increased. Furthermore, in Comparative Example 1-3, although the reflected light intensity was decreased by the resin fine particles contained in the auxiliary liquid, since the particle diameter was large, the cloudiness (haze) was generated. In Comparative Example 1-4, since the particle diameter of the resin fine particles contained in the auxiliary liquid was small, a desired reflected light suppression effect could not be obtained. In addition, in all Examples and Comparative Examples, it was shown that the glossiness after the abrasion was maintained. Accordingly, it can be said that when image recording is performed by the method of the present invention, a printed material having an excellent image durability and a high visibility capable of suppressing exterior light reflection can be obtained.

TABLE 1-1

| EXAMPLE No. | TYPE OF PARTICLES | AVERAGE PARTICLE DIAMETER (nm) | SPHERICITY | APPLICATION METHOD OF AUXILIARY LIQUID/FIRST AUXILIARY LIQUID | COVERAGE (%) |
|---|---|---|---|---|---|
| EXAMPLE 1-1 | RESIN PARTICLES | 198 | 1.2 | INK JET | 100 |
| EXAMPLE 1-2 | RESIN PARTICLES | 300 | 1.4 | INK JET | 100 |

TABLE 1-1-continued

| EXAMPLE No. | | | | | |
|---|---|---|---|---|---|
| EXAMPLE 1-3 | RESIN PARTICLES | 257 | 1.3 | INK JET | 100 |
| EXAMPLE 1-4 | RESIN PARTICLES | 172 | 1.2 | INK JET | 100 |
| EXAMPLE 1-5 | RESIN PARTICLES | 141 | 1.2 | INK JET | 100 |
| EXAMPLE 1-6 | RESIN PARTICLES | 110 | 1.2 | INK JET | 100 |
| EXAMPLE 1-7 | RESIN PARTICLES | 198 | 1.2 | INK JET | 90 |
| EXAMPLE 1-8 | RESIN PARTICLES | 198 | 1.2 | INK JET | 50 |
| EXAMPLE 1-9 | HOLLOW SILICA | 105 | 1.3 | INK JET | 100 |
| EXAMPLE 1-10 | SILICA COLLOID | 200 | 1.4 | INK JET | 100 |
| EXAMPLE 1-11 | RESIN PARTICLES | 198 | 1.2 | BAR COATER | 100 |
| EXAMPLE 1-12 | RESIN PARTICLES | 198 | 1.2 | INK JET | 100 |
| EXAMPLE 1-13 | RESIN PARTICLES | 400 | 1.4 | INK JET | 100 |
| COMPARATIVE EXAMPLE 1-1 | — | — | — | — | — |
| COMPARATIVE EXAMPLE 1-2 | RESIN PARTICLES | 198 | 1.2 | INK JET | 100 |
| COMPARATIVE EXAMPLE 1-3 | RESIN PARTICLES | 420 | 1.4 | INK JET | 100 |
| COMPARATIVE EXAMPLE 1-4 | RESIN PARTICLES | 80 | 1.1 | INK JET | 100 |

| EXAMPLE No. | GLASS TRANSITION TEMPERATURE OF SPHERICAL PARTICLES CONTAINED IN AUXILIARY LIQUID/FIRST AUXILIARY LIQUID (° C.) | GLASS TRANSITION TEMPERATURE OF RESIN PARTICLES CONTAINED IN INK (° C.) | TEMPERATURE OF IMAGE DURING FORMATION OF FINE IRREGULAR LAYER (° C.) | LOAD PRESSURE (kg/cm$^2$) |
|---|---|---|---|---|
| EXAMPLE 1-1 | 90 | 90 | 70 | 15 |
| EXAMPLE 1-2 | 85 | 90 | 70 | 15 |
| EXAMPLE 1-3 | 82 | 90 | 70 | 15 |
| EXAMPLE 1-4 | 100 | 90 | 70 | 15 |
| EXAMPLE 1-5 | 85 | 90 | 70 | 15 |
| EXAMPLE 1-6 | 80 | 90 | 70 | 15 |
| EXAMPLE 1-7 | 90 | 90 | 70 | 15 |
| EXAMPLE 1-8 | 90 | 90 | 70 | 15 |
| EXAMPLE 1-9 | — | 90 | 70 | 15 |
| EXAMPLE 1-10 | — | 90 | 70 | 15 |
| EXAMPLE 1-11 | 90 | 90 | 70 | 15 |
| EXAMPLE 1-12 | 90 | 50 | 70 | 15 |
| EXAMPLE 1-13 | 90 | 90 | 70 | 15 |
| COMPARATIVE EXAMPLE 1-1 | — | 90 | 70 | 15 |
| COMPARATIVE EXAMPLE 1-2 | 50 | 90 | 70 | 15 |
| COMPARATIVE EXAMPLE 1-3 | 80 | 90 | 70 | 15 |
| COMPARATIVE EXAMPLE 1-4 | 85 | 90 | 70 | 15 |

TABLE 1-2

| EXAMPLE No. | AVERAGE HEIGHT OF CONVEX PORTIONS (μm) | IMAGE DEFINITION C(2) (%) | 20° GLOSS | REFRACTIVE INDEX | EVALUATION OF HAZE | CHANGE IN GLOSS AFTER ABRASION |
|---|---|---|---|---|---|---|
| EXAMPLE 1-1 | 0.09 | 88 | 40 | 1.32 | A | NO |
| EXAMPLE 1-2 | 0.15 | 88 | 20 | 1.22 | A | NO |
| EXAMPLE 1-3 | 0.13 | 88 | 30 | 1.27 | A | NO |
| EXAMPLE 1-4 | 0.08 | 88 | 50 | 1.36 | A | NO |
| EXAMPLE 1-5 | 0.07 | 88 | 60 | 1.40 | A | NO |
| EXAMPLE 1-6 | 0.04 | 88 | 70 | 1.44 | A | NO |
| EXAMPLE 1-7 | 0.09 | 88 | 60 | 1.40 | A | NO |
| EXAMPLE 1-8 | 0.09 | 88 | 65 | 1.42 | A | NO |
| EXAMPLE 1-9 | 0.05 | 88 | 35 | 1.27 | A | NO |
| EXAMPLE 1-10 | 0.10 | 88 | 40 | 1.32 | A | NO |
| EXAMPLE 1-11 | 0.09 | 88 | 40 | 1.32 | A | NO |
| EXAMPLE 1-12 | 0.09 | 95 | 40 | 1.32 | A | NO |
| EXAMPLE 1-13 | 0.15 | 88 | 18 | 1.20 | B | NO |
| COMPARATIVE EXAMPLE 1-1 | 0 | 88 | 80 | 1.48 | A | NO |

TABLE 1-2-continued

| EXAMPLE No. | AVERAGE HEIGHT OF CONVEX PORTIONS (μm) | IMAGE DEFINITION C(2) (%) | 20° GLOSS | REFRACTIVE INDEX | EVALUATION OF HAZE | CHANGE IN GLOSS AFTER ABRASION |
|---|---|---|---|---|---|---|
| COMPARATIVE EXAMPLE 1-2 | 0 | 88 | 75 | 1.46 | A | NO |
| COMPARATIVE EXAMPLE 1-3 | 0.16 | 88 | 16 | 1.22 | C | NO |
| COMPARATIVE EXAMPLE 1-4 | 0.03 | 88 | 75 | 1.46 | A | NO |

TABLE 1-3

| EXAMPLE No. | TYPE OF PARTICLES | AVERAGE PARTICLE DIAMETER (nm) | SPHERICITY | APPLICATION METHOD OF AUXILIARY LIQUID/FIRST AUXILIARY LIQUID | COVERAGE (%) | GLASS TRANSITION TEMPERATURE OF SPHERICAL PARTICLES CONTAINED IN AUXILIARY LIQUID/FIRST AUXILIARY LIQUID (° C.) | GLASS TRANSITION TEMPERATURE OF RESIN PARTICLES CONTAINED IN INK (° C.) |
|---|---|---|---|---|---|---|---|
| EXAMPLE 1-14 | RESIN PARTICLES | 198 | 1.2 | INK JET | 100 | 140 | 90 |
| EXAMPLE 1-15 | RESIN PARTICLES | 198 | 1.2 | INK JET | 100 | 90 | 90 |
| EXAMPLE 1-16 | RESIN PARTICLES | 198 | 1.2 | INK JET | 100 | 90 | 90 |
| EXAMPLE 1-17 | RESIN PARTICLES | 198 | 1.2 | INK JET | 100 | 90 | 90 |

| EXAMPLE No. | GLASS TRANSITION TEMPERATURE OF WATER-SOLUBLE RESIN IN SECOND AUXILIARY LIQUID (° C.) | FIRST TEMPERATURE OF TRANSFER MEMBER Tc (° C.) | SECOND TEMPERATURE OF TRANSFER MEMBER Tr (° C.) | TEMPERATURE DURING FORMATION OF FINE IRREGULAR LAYER (° C.) | LOAD PRESSURE (kg/cm²) |
|---|---|---|---|---|---|
| EXAMPLE 1-14 | — | 130 | 100 | 70 | 15 |
| EXAMPLE 1-15 | 78 | 80 | 25 | 70 | 15 |
| EXAMPLE 1-16 | 60 | 70 | 40 | 70 | 15 |
| EXAMPLE 1-17 | 78 | 80 | 25 | 70 | 15 |

TABLE 1-4

| EXAMPLE No. | AVERAGE HEIGHT OF CONVEX PORTIONS (μm) | TRANSFER RATE (%) | IMAGE DEFINITION C(2) (%) | 20° GLOSS | REFRACTIVE INDEX | EVALUATION OF HAZE | CHANGE IN GLOSS AFTER ABRASION |
|---|---|---|---|---|---|---|---|
| EXAMPLE 1-14 | 0.09 | 90 | 88 | 40 | 1.32 | A | NO |
| EXAMPLE 1-15 | 0.09 | 93 | 88 | 40 | 1.32 | A | NO |
| EXAMPLE 1-16 | 0.09 | 93 | 88 | 40 | 1.32 | A | NO |
| EXAMPLE 1-17 | 0.09 | 93 | 88 | 40 | 1.32 | A | NO |

Example 2-1

(Preparation of Auxiliary Liquid Resin Particle Dispersion)

As an auxiliary liquid resin particle dispersion, by adjusting the polymerization time and the like to prepare the ink resin particle dispersion, a dispersion containing resin particles having an average particle diameter of 400 nm and a glass transition temperature of 85° C. and a dispersion containing resin particles having an average particle diameter of 80 nm and a glass transition temperature of 32° C. were obtained.

(Preparation of Auxiliary Liquid)

After 7 parts of the auxiliary liquid resin particle dispersion having a particle diameter of 400 nm, 3 parts of the auxiliary liquid dispersion having a particle diameter of 80 nm, 3 parts of a water-soluble resin (styrene-butyl acrylate-acrylic acid copolymer (acid value: 132, weight average molecular weight: 7,700, glass transition temperature: 78° C.); solid component: 20%; neutralized with potassium hydroxide), 7 parts of glycerin, 3 parts of a poly(ethylene glycol) (number average molecular weight (Mn): 1,000), 0.5 parts of a surfactant (Acetylenol E100, manufactured by Kawaken Fine Chemicals Co., Ltd.), and the balance ion exchanged water were mixed together, sufficient stirring was performed. Subsequently, pressure filtration was performed on this mixture using a microfilter (manufactured by Fujifilm Corporation) having a pore size of 3.0 μm, so that an auxiliary liquid (surface tension: 35 mN/m) was prepared.

(Image Recording)

In this example, except for that the auxiliary liquid was changed, image recording was performed by a method similar to that of Example 1-1 using the image recording apparatus shown in FIG. 5.

Example 2-2

The polymerization time to prepare the auxiliary liquid resin particle dispersion and the monomer ratio to obtain the resin particles were changed, so that the following auxiliary liquid resin particle dispersions were prepared. One is an auxiliary liquid resin particle dispersion having an average particle diameter of 160 nm and a glass transition temperature of 85° C., and the other is an auxiliary liquid resin particle dispersion having an average particle diameter of 80 nm and a glass transition temperature of 40° C. Except for that 9 parts of the dispersion having a particle diameter of 160 nm and 1 part of the dispersion having a particle diameter of 80 nm were used for the auxiliary liquid, image formation was performed in a manner similar to that of Example 2-1.

Example 2-3

The polymerization time to prepare the auxiliary liquid resin particle dispersion and the monomer ratio to obtain the resin particles were changed, so that the following auxiliary liquid resin particle dispersions were prepared. One is an auxiliary liquid resin particle dispersion having an average particle diameter of 110 nm and a glass transition temperature of 80° C., and the other is an auxiliary liquid resin particle dispersion having an average particle diameter of 50 nm and a glass transition temperature of 30° C. Except for that 9.5 parts of the dispersion having a particle diameter of 110 nm and 0.5 parts of the dispersion having a particle diameter of 50 nm were used for the auxiliary liquid, image formation was performed in a manner similar to that of Example 2-1.

Example 2-4

(Image Recording)

In this example, except for that the auxiliary liquid was changed, image recording was performed by a method similar to that of Example 1-4 using the image recording apparatus shown in FIG. 6. In addition, since a reaction liquid and an ink used in the apparatus shown in FIG. 6 were formed in a manner similar to that for those used in the apparatus shown in FIG. 5, description thereof is omitted.

Hereinafter, a first auxiliary liquid will be described. As a resin particle dispersion contained in the first auxiliary liquid, the following two types were prepared. One is a dispersion having an average particle diameter of 198 nm and a glass transition temperature of 140° C., and the other is a dispersion having an average particle diameter of 60 nm and a glass transition temperature of 50° C. After 9 parts of the resin particle dispersion having an average particle diameter of 198 nm, 1 part of the resin particle dispersion having an average particle diameter of 60 nm, 3 parts of a water-soluble resin (styrene-butyl acrylate-acrylic acid copolymer (acid value: 132, weight average molecular weight: 7,700, glass transition temperature: 78° C.); solid component: 20%; neutralized with potassium hydroxide), 7 parts of glycerin, 3 parts of a poly(ethylene glycol) (number average molecular weight (Mn): 1,000), 0.5 parts of a surfactant (Acetylenol E100, manufactured by Kawaken Fine Chemicals Co., Ltd.), and the balance ion exchanged water were mixed together, sufficient stirring was performed. Subsequently, pressure filtration was performed on this mixture using a microfilter (manufactured by Fujifilm Corporation) having a pore size of 3.0 μm, so that the first auxiliary liquid (surface tension: 35 mN/m) was prepared. The surface tension of the auxiliary liquid was measured by an automatic surface tension meter (DY-300, manufactured by Kyowa Interface Science Co., Ltd.).

Example 2-5

Image recording was performed using the image recording apparatus shown in FIG. 7. In addition, since the ink jet device 411 applying a second auxiliary liquid was added, the apparatus of this example was different from the apparatus shown in FIG. 6. Since a reaction liquid, an ink, and a first auxiliary liquid were prepared in a manner similar to that for those in the method of Example 2-4, description thereof is omitted. In addition, since the second auxiliary liquid was prepared by a method similar to that described in Example 1-15, description thereof is omitted.

Example 2-6

A second auxiliary liquid containing a water-soluble resin (styrene-butyl methacrylate-acrylic acid copolymer (acid value: 87, weight average molecular weight: 9,300, glass transition temperature: 60° C.) having a glass transition temperature of 60° C. was used. Furthermore, during the transfer, a first temperature of the transfer member 301 was set to 70° C., and a second temperature of the recording medium 108 was set to 40° C. Except for that those described above, image recording was performed in a manner similar to that of Example 2-5.

Example 2-7

Except for that image recording was performed using the image recording apparatus shown in FIG. 8, image recording was performed in a manner similar to that of Example 2-5.

Comparative Example 2-1

Except for that ion exchanged water was used instead of using the auxiliary liquid resin particles, image formation was performed in a manner similar to that of Example 2-1.

Comparative Example 2-2

Except for that as the auxiliary liquid resin particle dispersion, a dispersion of auxiliary liquid resin particles having an average particle diameter of 400 nm and a glass transition temperature of 85° C. was only used, image formation was performed in a manner similar to that of Example 2-1.

<Measurement of Transfer Rate of Intermediate Image>

The transfer rate of the intermediate image of each of Examples 2-4 to 2-7 was measured by a method similar to that of the above Examples 1-4 to 1-7, and hence, description thereof is omitted.

<Image Evaluation>

A cross-sectional shape of the fine irregular layer was measured by a scanning electron microscope (Hitachi High-Technologies Corporation, S-4800). An observation magnification was set to 20,000 times, and an area ratio between the maximum particles and the minimum particles was measured from a cross-sectional image having a width of 6 μm and a height of 2 μm. Furthermore, the average height of the convex portions of the surface of the fine irregular layer was obtained in such a way that from this cross-sectional image, 20 particles were each measured, and the average value was obtained from the measured values thus obtained. In addition, it was also confirmed by the observation of the region of the 20 particles of the cross-sectional image that the surface of the fine irregular layer was smoothed at a cycle of from visible light to less than visible limit. As a result, all the printed materials obtained in Examples were smoothed in a cycle of from visible light to less than visible limit. In addition, from this cross-sectional image, it was confirmed in the fine irregular layer of the printed material obtained in each example that a plurality of spherical particles was present in a thickness direction of the fine irregular layer.

<Evaluation of Glossiness and Evaluation of Abrasion Property>

Since the evaluation of the glossiness and the evaluation of the abrasion property of Examples 2-1 to 2-7 and Comparative Examples 2-1 and 2-2 were each performed by a method similar to that of Example 1-1, description thereof is omitted.

In the following Table 2-1, the image clarity, the reflected light intensity, the haze of the image, the coloration, and the like of each of Examples and Comparative Examples are shown. In Examples 2-1 to 2-7 in which the method of the present invention was used, a high image clarity, a low reflected light intensity, no haze, and no coloration were obtained as the results. On the other hand, since the auxiliary liquid resin particles were not contained in the auxiliary liquid in Comparative Example 2-1, although a high image clarity and no haze could be obtained, the reflected light intensity was increased. Although the auxiliary liquid resin particles were contained in the auxiliary liquid in Comparative Example 2-2, by the influence of voids and the like in the fine irregular layer, the coloration occurred in the image. In addition, it was also shown that the glossiness after the abrasion was maintained in each of Examples and Comparative Examples.

Accordingly, it can be said that by performing the image recording by the method of the present invention, a printed material having an excellent image durability and a high visibility capable of suppressing exterior light reflection can be obtained.

TABLE 2-1

| EXAMPLE No. | AVERAGE HEIGHT OF CONVEX PORTIONS (μm) | MAXIMUM PARTICLES | | | MINIMUM PARTICLES | |
|---|---|---|---|---|---|---|
| | | VOLUME RATE IN FINE IRREGULAR LAYER (%) | SPHERICITY | GLASS TRANSITION TEMPERATURE (C. °) | VOLUME RATE IN FINE IRREGULAR LAYER (%) | SPHERICITY |
| EXAMPLE 2-1 | 0.15 | 70 | 1.4 | 85 | 30 | 1.1 |
| EXAMPLE 2-2 | 0.09 | 90 | 1.2 | 85 | 10 | 1.1 |
| EXAMPLE 2-3 | 0.04 | 95 | 1.2 | 80 | 5 | 1.1 |
| EXAMPLE 2-4 | 0.10 | 90 | 1.2 | 140 | 10 | 1.1 |
| EXAMPLE 2-5 | 0.10 | 90 | 1.2 | 140 | 10 | 1.1 |
| EXAMPLE 2-6 | 0.10 | 90 | 1.2 | 140 | 10 | 1.1 |
| EXAMPLE 2-7 | 0.10 | 90 | 1.2 | 140 | 10 | 1.1 |
| COMPARATIVE EXAMPLE 2-1 | 0 | — | — | — | — | — |
| COMPARATIVE EXAMPLE 2-2 | 0.17 | 100 | 1.4 | 85 | 0 | — |

| EXAMPLE No. | MINIMUM PARTICLES GLASS TRANSITION TEMPERATURE (C. °) | IMAGE DEFINITION C(2) (%) | 20° GLOSS | HAZE VALUE | CHANGE IN GLOSS AFTER ABRASION | PRESENCE OR ABSENCE OF COLORATION |
|---|---|---|---|---|---|---|
| EXAMPLE 2-1 | 32 | 88 | 20 | 3.8 | NO | NO |
| EXAMPLE 2-2 | 40 | 88 | 40 | 3.2 | NO | NO |
| EXAMPLE 2-3 | 30 | 88 | 70 | 2.3 | NO | NO |
| EXAMPLE 2-4 | 60 | 88 | 40 | 3.4 | NO | NO |
| EXAMPLE 2-5 | 60 | 88 | 40 | 3.3 | NO | NO |
| EXAMPLE 2-6 | 60 | 88 | 45 | 3.4 | NO | NO |

TABLE 2-1-continued

| EXAMPLE 2-7 | 60 | 88 | 45 | 3.1 | NO | NO |
|---|---|---|---|---|---|---|
| COMPARATIVE EXAMPLE 2-1 | — | 88 | 80 | 0.9 | NO | NO |
| COMPARATIVE EXAMPLE 2-2 | — | 88 | 14 | 24 | NO | YES |

Example 3-1

(Preparation of Auxiliary Liquid Resin Particle Dispersion)

As an auxiliary liquid resin particle dispersion, by adjusting the polymerization time to prepare the ink resin particle dispersion, a dispersion containing spherical particles having an average particle diameter of 300 nm and a glass transition temperature of 85° C. and a dispersion containing spherical particles having an average particle diameter of 75 nm and a glass transition temperature of 85° C. were obtained. (Preparation of Auxiliary Liquids)

After 7 parts of the auxiliary liquid resin particle dispersion having an average particle diameter of 300 nm, 3 parts of the auxiliary liquid resin particle dispersion having an average particle diameter of 75 nm, 3 parts of a water-soluble resin (styrene-butyl acrylate-acrylic acid copolymer (acid value: 132, weight average molecular weight: 7,700, glass transition temperature: 78° C.); solid component: 20%; neutralized with potassium hydroxide), 7 parts of glycerin, 3 parts of a polyethylene glycol) (number average molecular weight (Mn): 1,000), 0.5 parts of a surfactant (Acetylenol E100, manufactured by Kawaken Fine Chemicals Co., Ltd.), and the balance ion exchanged water were mixed together, sufficient stirring was performed. Subsequently, pressure filtration was performed on this mixture using a microfilter (manufactured by Fujifilm Corporation) having a pore size of 3.0 μm, so that the auxiliary liquid (surface tension: 35 mN/m) was prepared.
(Image Recording)

In this example, except for that the auxiliary liquid was changed, image recording was performed by a method similar to that of Example 1-1 using the image recording apparatus shown in FIG. 5.

Example 3-2

The polymerization time to prepare the auxiliary liquid resin particle dispersion and the monomer ratio to obtain the resin particles were changed, so that the following auxiliary liquid resin particle dispersions were prepared. One is an auxiliary liquid resin particle dispersion having an average particle diameter of 160 nm and a glass transition temperature of 85° C., and the other is an auxiliary liquid resin particle dispersion having an average particle diameter of 80 nm and a glass transition temperature of 85° C. Except for that 9 parts of the dispersion having a particle diameter of 160 nm and 1 part of the dispersion having a particle diameter of 80 nm were used for the auxiliary liquid, image formation was performed in a manner similar to that of Example 3-1.

Example 3-3

The polymerization time to prepare the auxiliary liquid resin particle dispersion and the monomer ratio to obtain the resin particles were changed, so that the following auxiliary liquid resin particle dispersions were prepared. One is an auxiliary liquid resin particle dispersion having an average particle diameter of 110 nm and a glass transition temperature of 80° C., and the other is an auxiliary liquid resin particle dispersion having an average particle diameter of 50 nm and a glass transition temperature of 80° C. Except for that 9.5 parts of the dispersion having a particle diameter of 110 nm and 0.5 parts of the dispersion having a particle diameter of 50 nm were used for the auxiliary liquid, image formation was performed in a manner similar to that of Example 3-1.

Example 3-4

(Image Recording)

In this example, except for that the auxiliary liquid was changed, image recording was performed by a method similar to that of Example 1-4 using the image recording apparatus shown in FIG. 6. In addition, since a reaction liquid and an ink used for the apparatus shown in FIG. 6 were formed in a manner similar to that for those used in the apparatus shown in FIG. 5, description thereof is omitted.

Hereinafter, a first auxiliary liquid will be described. As a resin particle dispersion contained in the first auxiliary liquid, the following two types were prepared. One is a resin particle dispersion having an average particle diameter of 198 nm and a glass transition temperature of 140° C., and the other is a resin particle dispersion having an average particle diameter of 60 nm and a glass transition temperature of 150° C. After 8 parts of the resin particle dispersion having an average particle diameter of 198 nm, 2 parts of the resin particle dispersion having an average particle diameter of 60 nm, 3 parts of a water-soluble resin (styrene-butyl acrylate-acrylic acid copolymer (acid value: 132, weight average molecular weight: 7,700, glass transition temperature: 78° C.); solid component: 20%; neutralized with potassium hydroxide), 7 parts of glycerin, 3 parts of a poly(ethylene glycol) (number average molecular weight (Mn): 1,000), 0.5 parts of a surfactant (Acetylenol E100, manufactured by Kawaken Fine Chemicals Co., Ltd.), and the balance ion exchanged water were mixed together, sufficient stirring was performed. Subsequently, pressure filtration was performed on this mixture using a microfilter (manufactured by Fujifilm Corporation) having a pore size of 3.0 μm, so that the first auxiliary liquid (surface tension: 35 mN/m) was prepared. The surface tension of the auxiliary liquid was measured by an automatic surface tension meter (DY-300, manufactured by Kyowa Interface Science Co., Ltd.).

Example 3-5

Image recording was performed using the image recording apparatus shown in FIG. 7. In addition, since the ink jet device 411 applying a second auxiliary liquid was added, the apparatus of this example was different from the apparatus shown in FIG. 6. Since a reaction liquid, an ink, and a first auxiliary liquid were prepared by a method similar to that of Example 2-4, description thereof is omitted. In addition, since the second auxiliary liquid was prepared by a method similar to that of Example 1-15, description thereof is omitted.

Example 3-6

A second auxiliary liquid containing a water-soluble resin (styrene-butyl methacrylate-acrylic acid copolymer (acid value: 87, weight average molecular weight: 9,300, glass transition temperature: 60° C.) having a glass transition temperature of 60° C. was used. Furthermore, during the transfer, a first temperature of the transfer member 301 and a second temperature of the recording medium 108 were set to 70° C. and 40° C., respectively. Except for that those described above, image recording was performed in a manner similar to that of Example 3-5.

Example 3-7

Except for that image recording was performed using the image recording apparatus shown in FIG. 8, image recording was performed in a manner similar to that of Example 3-5.

Comparative Example 3-1

Except for that ion exchanged water was used instead of using the auxiliary liquid resin particles, image formation was performed in a manner similar to that of Example 3-1.

Comparative Example 3-2

Except for that auxiliary liquid resin particles having an average particle diameter of 400 nm and a glass transition temperature of 85° C. were only used as the auxiliary liquid resin particle dispersion, image formation was performed in a manner similar to that of Example 3-1.

<Measurement of Transfer Rate of Intermediate Image>

Since the transfer rates in Examples 3-4 to 3-7 were each measured by a method similar to that of Example 1-4, description thereof is omitted.

<Image Evaluation, Evaluation of Glossiness, and Evaluation of Abrasion Property>

Since the image evaluation of each of Examples 3-1 to 3-7 and Comparative Examples 3-1 and 3-2 was performed by a method similar to that of Example 2-1, and the evaluation of the glossiness and the evaluation of the abrasion property were each performed by a method similar to that of Example 1-1, description thereof is omitted.

In the following Table 3-1, the image clarity, the reflected light intensity, the haze of the image, the coloration, and the like are shown. In Examples 3-1 to 3-7 in which the method of the present invention was used, a high image clarity, a low reflected light intensity, no haze, and no coloration were obtained as the results. On the other hand, since the auxiliary liquid resin particles were not contained in the auxiliary liquid of Comparative Example 3-1, although a high image clarity and no haze could be obtained, the reflected light intensity was increased. Although the auxiliary liquid resin particles were contained in the auxiliary liquid of Comparative Example 3-2, by the influence of voids and the like in the fine irregular layer, the coloration occurred in the image. In addition, it was also shown that the glossiness after the abrasion was maintained in each of Examples and Comparative Examples.

Accordingly, it can be said that by performing the image recording by the method of the present invention, a printed material having an excellent image durability and a high visibility capable of suppressing exterior light reflection can be obtained.

TABLE 3-1

| | | MAXIMUM PARTICLES | | | MINIMUM PARTICLES | |
|---|---|---|---|---|---|---|
| EXAMPLE No. | AVERAGE HEIGHT OF CONVEX PORTIONS (μm) | VOLUME RATE IN FINE IRREGULAR LAYER (%) | SPHERICITY | GLASS TRANSITION TEMPERATURE (C. °) | VOLUME RATE IN FINE IRREGULAR LAYER (%) | SPHERICITY |
| EXAMPLE 3-1 | 0.10 | 70 | 1.4 | 85 | 30 | 1.1 |
| EXAMPLE 3-2 | 0.09 | 90 | 1.2 | 85 | 10 | 1.1 |
| EXAMPLE 3-3 | 0.04 | 95 | 1.2 | 80 | 5 | 1.1 |
| EXAMPLE 3-4 | 0.10 | 80 | 1.2 | 140 | 20 | 1.1 |
| EXAMPLE 3-5 | 0.10 | 80 | 1.2 | 140 | 20 | 1.1 |
| EXAMPLE 3-6 | 0.10 | 80 | 1.2 | 140 | 20 | 1.2 |
| EXAMPLE 3-7 | 0.10 | 80 | 1.2 | 140 | 20 | 1.2 |
| COMPARATIVE EXAMPLE 3-1 | 0 | — | — | — | — | — |
| COMPARATIVE EXAMPLE 3-2 | 0.17 | 100 | 1.4 | 85 | 0 | — |

| EXAMPLE No. | MINIMUM PARTICLES GLASS TRANSITION TEMPERATURE (C. °) | IMAGE DEFINITION C(2) (%) | 20° GLOSS | HAZE VALUE | CHANGE IN GLOSS AFTER ABRASION | PRESENCE OR ABSENCE OF COLORATION |
|---|---|---|---|---|---|---|
| EXAMPLE 3-1 | 85 | 88 | 40 | 3.5 | NO | NO |
| EXAMPLE 3-2 | 85 | 88 | 40 | 3.1 | NO | NO |
| EXAMPLE 3-3 | 80 | 88 | 70 | 2.1 | NO | NO |
| EXAMPLE 3-4 | 150 | 88 | 40 | 3.3 | NO | NO |
| EXAMPLE 3-5 | 60 | 88 | 40 | 3.3 | NO | NO |
| EXAMPLE 3-6 | 140 | 88 | 45 | 3.1 | NO | NO |
| EXAMPLE 3-7 | 140 | 88 | 45 | 3.4 | NO | NO |
| COMPARATIVE EXAMPLE 3-1 | — | 88 | 80 | 0.9 | NO | NO |
| COMPARATIVE EXAMPLE 3-2 | — | 88 | 14 | 23 | NO | YES |

Example 4-1

(Preparation of Auxiliary Liquid Resin Particle Dispersion)

Two types of auxiliary liquid resin particle dispersions having different average particle diameters were prepared. By adjusting the polymerization time to prepare the ink resin particle dispersion, a dispersion containing spherical particles having an average particle diameter of 230 nm and a glass transition temperature of 85° C. and a dispersion containing spherical particles having an average particle diameter of 80 nm and a glass transition temperature of 85° C. were obtained.

(Preparation of Auxiliary Liquid)

By the use of the above two types of auxiliary liquid resin particles dispersions having different average particle diameters, two types of auxiliary liquids were formed. After 5 parts of the auxiliary liquid resin particle dispersion, 3 parts of a water-soluble resin (styrene-butyl acrylate-acrylic acid copolymer (acid value: 132, weight average molecular weight: 7,700, glass transition temperature: 78° C.); solid component: 20%; neutralized with potassium hydroxide), 7 parts of glycerin, 3 parts of a poly(ethylene glycol) (number average molecular weight (Mn): 1,000), 0.5 parts of a surfactant (Acetylenol E100, manufactured by Kawaken Fine Chemicals Co., Ltd.), and the balance ion exchanged water were mixed together, sufficient stirring was performed. Subsequently, pressure filtration was performed on this mixture using a microfilter (manufactured by Fujifilm Corporation) having a pore size of 3.0 μm, so that the auxiliary liquid (surface tension: 35 mN/m) was prepared.

(Image Recording)

In this example, except for that the two types of auxiliary liquids were used, and as the auxiliary liquid application means, two ink jet devices 207 and 247 were used, image recording was performed by a method similar to that of Example 1-1 using the image recording apparatus shown in FIG. 5. In addition, the ink jet device 207 used the auxiliary liquid having an average particle diameter of 80 nm, and the ink jet device 247 used the auxiliary liquid having an average particle diameter of 230 nm. In addition, those auxiliary liquids were each applied so that the coverage of the ink image by the auxiliary liquid image was 100% and so that in a distribution of the particles in the fine irregular layer, the existence provability of the large particles was high in the vicinity of a surface layer, and the existence probability of the small particles was high in the vicinity of the color material layer. As a result, the fine irregular layer was formed to have a particle size distribution of the spherical particles in which the particle diameter at a peak position of the particle size distribution of the spherical particles located at a surface side is larger than the particle diameter at a peak position of the particle size distribution of the spherical particles located at the color material layer side.

Example 4-2

Example 4-2

By the use of an auxiliary liquid resin particle dispersion containing spherical particles having an average particle diameter of 400 nm and a glass transition temperature of 80° C. and an auxiliary liquid resin particle dispersion containing spherical particles having an average particle diameter of 80 nm and a glass transition temperature of 85° C., two types of auxiliary liquids were prepared. Except for that those auxiliary liquids were used, image formation was performed in a manner similar to that of Example 1. In addition, the compositions of the two types of auxiliary liquids were as follows.

The auxiliary liquid using spherical particles having a small average particle diameter ejected from the ink jet device 207 auxiliary liquid resin particle dispersion (average particle diameter: 80 nm): 7 parts water-soluble resin: 3 parts glycerin: 7 parts poly(ethylene glycol): 3 parts surfactant: 0.5 parts ion exchanged water: the balance The auxiliary liquid using spherical particles having a large average particle diameter ejected from the ink jet device 247 auxiliary liquid resin particle dispersion (average particle diameter: 400 nm): 3 parts water-soluble resin: 3 parts glycerin: 7 parts poly(ethylene glycol): 3 parts surfactant: 0.5 parts ion exchanged water: the balance

Example 4-3

By the use of an auxiliary liquid resin particle dispersion containing spherical particles having an average particle diameter of 230 nm and a glass transition temperature of 85° C. and an auxiliary liquid resin particle dispersion containing spherical particles having an average particle diameter of 80 nm and a glass transition temperature of 85° C., two types of auxiliary liquids were prepared. In this case, the mixing ratio of the large particles and the small particles was changed, so that the two types of auxiliary liquids were prepared. Except for that those auxiliary liquids were used, image formation was performed in a manner similar to that of Example 1-1. In addition, the compositions of the two types of auxiliary liquids were as follows.

The auxiliary liquid using spherical particles having a small average particle diameter ejected from the ink jet device 207 auxiliary liquid resin particle dispersion (average particle diameter: 230 nm): 2 parts auxiliary liquid resin particle dispersion (average particle diameter: 80 nm): 3 parts water-soluble resin: 3 parts glycerin: 7 parts poly(ethylene glycol): 3 parts surfactant: 0.5 parts ion exchanged water: the balance The auxiliary liquid using spherical particles having a large average particle diameter ejected from the ink jet device 247 auxiliary liquid resin particle dispersion (average particle diameter: 230 nm): 3 parts auxiliary liquid resin particle dispersion (average particle diameter: 80 nm): 2 parts water-soluble resin: 3 parts glycerin: 7 parts poly(ethylene glycol): 3 parts surfactant: 0.5 parts ion exchanged water: the balance

Example 4-4

(Image Recording)

In this example, except for that the image recording apparatus shown in FIG. 9 was used, image formation was performed in a manner similar to that of Example 4-1. In the image recording apparatus shown in FIG. 9 used in this example, an image recording portion forming an ink image and an auxiliary liquid image recording portion forming an auxiliary liquid image were integrally formed. Hence, by controlling the recording method, although the two types of auxiliary liquids were only used, a fine irregular layer having different particle size distributions could be formed. By the use of the mask pattern shown in FIG. 11, an auxiliary liquid image was formed from the auxiliary liquid having an average particle diameter of 80 nm and the auxiliary liquid having an average particle diameter of 230 nm by the auxiliary liquid ink jet nozzle lines 607 and 647, respectively. In the fine irregular layer thus formed, a layer structure of the auxiliary liquids as shown in FIG. 12 is formed. A surface layer 1034 is a layer in which particles having a particle diameter of 230 nm cover 100% of a lower layer; a second surface layer 1033 is a layer in which particles having a particle diameter of 230 nm and particles having a particle diameter of 80 nm are present at a ratio of 3:2 and cover 100% of a lower layer; a third surface layer 1032 is a layer in which particles having a particle diameter of 230 nm and particles having a particle diameter of 80 nm are present at a ratio of 2:3 and cover 100% of a lower layer; and a fourth surface layer 1031 is a layer in which particles having a particle diameter of 80 nm cover 100% of the ink layer (color material layer).

In this example, although the layers forming the fine irregular layer are each formed to cover 100% of the layer located thereunder, when the fine irregular layer covers 100% of the ink layer, the layers are each not required to cover 100% of the layer located thereunder.

In addition, when the mask pattern is changed, and/or the auxiliary liquid images applied to the ink jet nozzle lines 607 and 647 are changed, the distribution of the particles in the fine irregular layer can be changed. Hence, in the structure described above, the fine irregular layers shown in Examples 4-1 and 4-3 may also be formed.

Example 4-5

(Image Recording)

In this example, except for that the auxiliary liquid was changed, image recording was performed by a method similar to that of Example 4-4 using the image recording apparatus shown in FIG. 6. In addition, as a head used in this example, instead of using the ink jet head shown in FIG. 6, there was used the ink jet head described in the image recording apparatus shown in FIG. 9 in which the ink application means and the auxiliary liquid application means were integrally formed. In addition, since a reaction liquid and an ink used in the apparatus shown in FIG. 6 were formed in a manner similar to that for those used in the apparatus shown in FIG. 5, description thereof is omitted.

Hereinafter, a first auxiliary liquid will be described. As the first auxiliary liquid, two types of auxiliary liquids were prepared using a dispersion containing large first auxiliary liquid resin particles having an average particle diameter of 400 nm and a glass transition temperature of 80° C. and a dispersion containing small first auxiliary liquid resin particles having an average particle diameter of 80 nm and a glass transition temperature of 85° C.

In addition, the ink jet device 347 used the auxiliary liquid having an average particle diameter of 400 nm, and the ink jet device 307 used the auxiliary liquid having an average particle diameter of 80 nm. In addition, those auxiliary liquids were each applied so that the coverage of a position on the transfer member at which an ink image was formed was 100% and so that in the distribution of the particles in the fine irregular layer, the existence provability of the large particles was high in the vicinity of the transfer member, and the existence probability of the small particles was high in the vicinity of the color material layer. As a result, the fine irregular layer was formed to have a particle size distribution of the spherical particles in which the particle diameter at a peak position of the particle size distribution of the spherical particles located at a surface side is larger than the particle diameter at a peak position of the particle size distribution of the spherical particles located at a color material layer side.

Example 4-6

Image recording was performed using the image recording apparatus shown in FIG. 7. In addition, since the ink jet device 411 applying a second auxiliary liquid was added, the apparatus of this example was different from the apparatus shown in FIG. 6. Since a reaction liquid, an ink, and a first auxiliary liquid were prepared by a method similar to that of the method of Example 4-1, description thereof is omitted. In addition, since the second auxiliary liquid was prepared by a method similar to that of Example 1-15, description thereof is omitted.

Example 4-7

A second auxiliary liquid containing a water-soluble resin (styrene-butyl methacrylate-acrylic acid copolymer (acid value: 87, weight average molecular weight: 9,300, glass transition temperature: 60° C.) having a glass transition temperature of 60° C. was used. Furthermore, during the transfer, a first temperature of the transfer member 301 and a second temperature of the recording medium 108 were set to 70° C. and 40° C., respectively. Except for that described above, image recording was performed in a manner similar to that of Example 4-6.

Example 4-8

Except for that image recording was performed using the image recording apparatus shown in FIG. 8, image recording was performed in a manner similar to that of Example 4-6.

Comparative Example 4-1

Except for that one type of auxiliary liquid using ion exchanged water was only used instead of using the auxiliary liquid resin particles, and the ink jet device 247 was not used, image formation was performed in a manner similar to that of Example 1. In addition, the composition of the auxiliary liquid was as follows.

The auxiliary liquid ejected from the ink jet device 207
  water-soluble resin: 3 parts
  glycerin: 7 parts
  poly(ethylene glycol): 3 parts
  surfactant: 0.5 parts
  ion exchanged water: the balance Comparative Example 4-2

Except for that one type of auxiliary liquid using auxiliary liquid resin particles having an average particle diameter of 230 nm and a glass transition temperature of 85° C. was only used, and the ink jet device 247 was not used, image formation was performed in a manner similar to that of Example 1. In addition, the composition of the auxiliary liquid was as follows.

The auxiliary liquid using particles ejected from the ink jet device 207 auxiliary liquid resin particle dispersion (average particle diameter: 230 nm): 10 parts water-soluble resin: 3 parts glycerin: 7 parts poly(ethylene glycol): 3 parts surfactant: 0.5 parts ion exchanged water: the balance In the following Table 4-1, the image clarity, the reflected light intensity, the haze of the image, and the like are shown. In Examples 4-1 to 4-8 in which the method of the present invention was used, a high image clarity, a low reflected light intensity, and no haze were obtained as the results. On the other hand, since the auxiliary liquid resin particles were not contained in the auxiliary liquid of Comparative Example 4-1, although a high image clarity and no haze could be obtained, the reflected light intensity was increased. In addition, although the auxiliary liquid resin particles were contained in the auxiliary liquid of Comparative Example 4-2, since the temperature of the image during the fine irregularity formation was higher than the glass transition temperature of the auxiliary liquid resin particles, the fine irregularity of the outermost layer was lost, and the reflected light intensity was increased.

Accordingly, it can be said that by performing the image recording by the method of the present invention, a printed material having an excellent image durability and a high visibility capable of suppressing exterior light reflection can be obtained.

TABLE 4-1

| EXAMPLE No. | AVERAGE HEIGHT OF CONVEX PORTIONS (μm) | MAXIMUM PARTICLES | | MINIMUM PARTICLES | |
|---|---|---|---|---|---|
| | | SPHERICITY | GLASS TRANSITION TEMPERATURE (C. °) | SPHERICITY | GLASS TRANSITION TEMPERATURE (C. °) |
| EXAMPLE 4-1 | 0.06 | 1.3 | 85 | 1.1 | 85 |
| EXAMPLE 4-2 | 0.08 | 1.4 | 80 | 1.1 | 85 |
| EXAMPLE 4-3 | 0.09 | 1.3 | 85 | 1.1 | 85 |
| EXAMPLE 4-4 | 0.09 | 1.3 | 85 | 1.1 | 85 |
| EXAMPLE 4-5 | 0.06 | 1.4 | 80 | 1.1 | 85 |
| EXAMPLE 4-6 | 0.06 | 1.3 | 85 | 1.1 | 85 |
| EXAMPLE 4-7 | 0.06 | 1.3 | 85 | 1.1 | 85 |
| EXAMPLE 4-8 | 0.06 | 1.3 | 85 | 1.1 | 85 |
| COMPARATIVE EXAMPLE 4-1 | 0 | — | — | — | — |
| COMPARATIVE EXAMPLE 4-2 | 0.17 | 1.3 | 85 | — | — |

| EXAMPLE No. | IMAGE DEFINITION C(2) (%) | 20° GLOSS | EVALUATION OF HAZE | CHANGE IN GLOSS AFTER ABRASION | PRESENCE OR ABSENCE OF COLORATION |
|---|---|---|---|---|---|
| EXAMPLE 4-1 | 88 | 36 | A | NO | NO |
| EXAMPLE 4-2 | 88 | 33 | A | NO | NO |
| EXAMPLE 4-3 | 88 | 30 | A | NO | NO |
| EXAMPLE 4-4 | 88 | 25 | A | NO | NO |
| EXAMPLE 4-5 | 88 | 36 | A | NO | NO |
| EXAMPLE 4-6 | 88 | 36 | A | NO | NO |
| EXAMPLE 4-7 | 88 | 36 | A | NO | NO |
| EXAMPLE 4-8 | 88 | 36 | A | NO | NO |
| COMPARATIVE EXAMPLE 4-1 | 88 | 80 | A | NO | NO |
| COMPARATIVE EXAMPLE 4-2 | 88 | 14 | C | NO | YES |

<Measurement of Transfer Rate of Intermediate Image>

Since the transfer rates in Examples 4-16 to 4-18 were each measured by a method similar to that of Example 1-4, description thereof is omitted.

<Image Evaluation, Evaluation of Glossiness, and Evaluation of Abrasion Property>

Since the image evaluation of each of Examples 4-1 to 4-7 and Comparative Examples 4-1 and 4-2 was performed by a method similar to that of Example 2-1, and in addition, the evaluation of the glossiness and the evaluation of the abrasion property were each performed by a method similar to that of Example 1-1, description thereof is omitted.

The present invention is not limited to the above-described embodiments and can be variously changed and modified without departing from the spirit and scope of the invention. Therefore, to apprise the public of the scope of the present invention, the following claims are appended.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printed material comprising:
   a recording medium;
   a color material layer; and
   a fine irregular layer functioning as an outermost layer in this order,
   wherein the color material layer contains a pigment,
   wherein the fine irregular layer contains spherical particles having an average particle diameter in a range of 110 to 400 nm,
   wherein the spherical particles are present in a thickness direction of the fine irregular layer,
   wherein a surface of the fine irregular layer has convex portions having an average height in a range of 0.04 to 0.15 μm, and
   wherein an image definition C(2) at an optical comb width of 2 mm is 50% or more.

2. The printed material according to claim 1, wherein an average refractive index of the fine irregular layer is 1.48 or less.

3. The printed material according to claim 1, wherein the fine irregular layer covers 90% or more of a surface of the color material layer.

4. The printed material according to claim 1, wherein the average particle diameter of the spherical particles is in a range of 110 to 300 nm.

5. The printed material according to claim 1, wherein the spherical particles are resin particles.

6. The printed material according to claim 1, wherein the fine irregular layer further contains a binding resin.

7. The printed material according to claim 1, wherein the fine irregular layer contains at least two types of the spherical particles and among the spherical particles, an average particle diameter of spherical particles having the largest average particle diameter is in a range of 110 to 300 nm, and an average particle diameter of spherical particles having the smallest average particle diameter is in a range of 0.25 to 0.5 times the average particle diameter of the spherical particles having the largest average particle diameter.

8. The printed material according to claim 7, wherein, in the fine irregular layer with respect to the total amount of the spherical particles contained in the fine irregular layer, the rate of spherical particles having the largest average particle diameter is in a range of 60 to 95 percent by volume, and the rate of spherical particles having the smallest average particle diameter is in a range of 5 to 40 percent by volume.

9. The printed material according to claim 1, wherein the fine irregular layer contains at least two types of the spherical particles and a particle diameter at a peak position of a particle size distribution of the spherical particles located at a surface side of the fine irregular layer is larger than a particle diameter at a peak position of the particle size distribution of the spherical particles located at a color material layer side of the fine irregular layer.

10. An image recording method for a printed material, the mage recording method comprising:
    applying a reaction liquid on a recording medium;
    applying an ink containing a pigment on the recording medium;
    applying an auxiliary liquid containing spherical particles having an average particle diameter in a range of 110 to 400 nm to the reaction liquid and the ink on the recording medium; and
    forming an image having a fine irregular layer as an outermost layer by treating a surface of a region to which the auxiliary liquid is applied to have convex portions having an average height in a range of 0.04 to 0.15 μm and an image definition C(2) of the image of 50% or more at an optical comb width of 2 mm.

11. The image recording method according to claim 10, wherein applying the auxiliary liquid includes applying the spherical particles to be in contact with a region to which the ink is applied.

12. The image recording method according to claim 10, wherein applying the auxiliary liquid includes applying the spherical particles so as not to be in contact with a region to which the ink is applied.

13. The image recording method according to claim 10, wherein the ink contains resin particles, and a glass transition temperature or a melting point of the spherical particles is higher than a glass transition temperature or a melting point of the resin particles contained in the ink.

14. The image recording method according to claim 10, wherein its applying the ink includes applying a clear ink containing no color material to a region on the recording medium to which the ink is not applied.

15. The image recording method according to claim 10, wherein forming the image includes pressurizing and heating a region to which the auxiliary liquid is applied by a fine irregular layer forming means.

16. The image recording method according to claim 10, wherein when the spherical particles are regarded as first spherical particles, the auxiliary liquid further contains second resin particles having a melting temperature or a softening temperature lower than that of the first spherical particles, and forming the image includes melting or softening the second resin particles.

17. The image recording method according to claim 10, wherein the fine irregular layer contains at least two types of the spherical particles and among the spherical particles, the average particle diameter of spherical particles having the largest average particle diameter is in a range of 110 to 300 nm, and the average particle diameter of spherical particles having the smallest average particle diameter is in a range of 0.25 to 0.5 times the average particle diameter of the spherical particles having the largest average particle diameter.

18. The image recording method according to claim 17, wherein, in the auxiliary liquid and with respect to the total amount of the spherical particles contained in the auxiliary liquid, the rate of the spherical particles having the largest average particle diameter is in a range of 60 to 95 percent by volume, and the rate of the spherical particles having the smallest average particle diameter is in a range of 5 to 40 percent by volume.

19. The image recording method according to claim 10, wherein the fine irregular layer contains at least two types of the spherical particles and a particle diameter at a peak position of a particle size distribution of the spherical particles located at a surface side of the fine irregular layer is larger than a particle diameter at a peak position of the particle size distribution of the spherical particles located at a color material layer side of the fine irregular layer.

20. The image recording method according to claim 10, wherein the spherical particles are present in a thickness direction of the fine irregular layer.

21. An image recording method comprising:
    applying a reaction liquid on a transfer member;
    applying an auxiliary liquid containing spherical particles having an average particle diameter in a range of 110 to 400 nm to the reaction liquid on the transfer member;
    forming an intermediate image by applying an ink containing a pigment to the reaction liquid and the auxiliary liquid on the transfer member;

transferring the intermediate image on the transfer member to a recording medium by bringing the intermediate image on the transfer member into contact with the recording medium; and forming an image having a fine irregular layer as an outermost layer by treating a surface of a region to which the auxiliary liquid is applied of the intermediate image on the recording medium obtained after transferring the intermediate image to have convex portions having an average height in a range of 0.04 to 0.15 µm and an image definition C(2) of the image of 50% or more at an optical comb width of 2 mm.

22. The image recording method according to claim 21, wherein the spherical particles are present in a thickness direction of the fine irregular layer.

23. An image recording method comprising:
applying a reaction liquid on a transfer member;
forming an intermediate image by applying an ink containing a pigment to the reaction liquid on the transfer member;
transferring the intermediate image on the transfer member to a recording medium by bringing the intermediate image on the transfer member into contact with the recording medium;
applying an auxiliary liquid containing spherical particles having an average particle diameter in a range of 110 to 400 nm to the intermediate image on the recording medium obtained after transferring the intermediate image; and
forming an image having a fine irregular layer as an outermost layer by treating a surface of a region to which the auxiliary liquid is applied to have convex portions having an average height in a range of 0.04 to 0.15 µm and an image definition C(2) of the image of 50% or more at an optical comb width of 2 mm.

24. The image recording method according to claim 23, wherein the spherical particles are present in a thickness direction of the fine irregular layer.

25. An image recording method comprising:
applying a reaction liquid on a transfer member;
applying a first auxiliary liquid containing spherical particles having an average particle diameter in a range of 110 to 400 nm to the reaction liquid on the transfer member;
applying an ink containing a pigment to the reaction liquid and the first auxiliary liquid on the transfer member;
forming an intermediate image by applying a second auxiliary liquid containing a water-soluble resin reactable with the reaction liquid to the reaction liquid, the first auxiliary liquid, and the ink on the transfer member;
transferring the intermediate image on the transfer member to a recording medium by bringing the intermediate image on the transfer member into contact with the recording medium; and
forming an image having a fine irregular layer as an outermost layer by treating a surface of a region to which the first auxiliary liquid is applied of the intermediate image on the recording medium obtained after transferring the intermediate image to have convex portions having an average height in a range of 0.04 to 0.15 µm and an image definition C(2) of the image of 50% or more at an optical comb width of 2 mm,
wherein a temperature (Tc) of the intermediate image to be brought into contact with the recording medium is a temperature equivalent to or more than the glass transition temperature of the water-soluble resin contained in the second auxiliary liquid, and a temperature (Tr) of the intermediate image to be peeled away from the transfer member is a temperature less than the glass transition temperature of the water-soluble resin contained in the second auxiliary liquid.

26. The image recording method according to claim 22, wherein the weight average molecular weight of the water-soluble resin contained in the second auxiliary liquid is in a range of 5,000 to 10,000.

27. The image recording method according to claim 25, wherein the spherical particles are present in a thickness direction of the fine irregular layer.

28. An image recording apparatus comprising:
a reaction liquid application means for applying a reaction liquid on a recording medium;
an ink application means for applying an ink containing a pigment to the reaction liquid on the recording medium;
an auxiliary liquid application means for applying an auxiliary liquid containing spherical particles having an average particle diameter in a range of 110 to 400 nm to the reaction liquid and the ink on the recording medium; and
a fine irregular layer forming means for forming an image having a fine irregular layer as an outermost layer by treating a surface of a region to which the auxiliary liquid is applied to have convex portions having an average height in a range of 0.04 to 0.15 µm and an image definition C(2) of the image of 50% or more at an optical comb width of 2 mm.

29. The image recording apparatus according to claim 28, wherein the spherical particles are present in a thickness direction of the fine irregular layer.

30. An image recording apparatus comprising:
a reaction liquid application means for applying a reaction liquid on a transfer member;
an auxiliary liquid application means for applying an auxiliary liquid containing spherical particles having an average particle diameter in a range of 110 to 400 nm to the reaction liquid on the transfer member;
an ink application means for applying an ink containing a pigment to the reaction liquid and the auxiliary liquid on the transfer member to form an intermediate image;
a transfer means for transferring the intermediate image on the transfer member to a recording medium by bringing the intermediate image on the transfer member into contact with the recording medium; and
a fine irregular layer forming means for forming an image having a fine irregular layer as an outermost layer by treating a surface of a region to which the auxiliary liquid is applied of the intermediate image on the recording medium obtained by the transfer means to have convex portions having an average height in a range of 0.04 to 0.15 µm and an image definition C(2) of the image of 50% or more at an optical comb width of 2 mm.

31. The image recording apparatus according to claim 30, wherein the spherical particles are present in a thickness direction of the fine irregular layer.

32. An image recording apparatus comprising:
a reaction liquid application means for applying a reaction liquid on a transfer member;
a first auxiliary liquid application means for applying a first auxiliary liquid containing spherical particles having an average particle diameter in a range of 110 to 400 nm to the reaction liquid on the transfer member;

an ink application means for applying an ink to the reaction liquid and the first auxiliary liquid on the transfer member;

a second auxiliary liquid application means for applying a second auxiliary liquid containing a water-soluble resin reactable with the reaction liquid to the reaction liquid, the first auxiliary liquid, and the ink on the transfer member;

a transfer means for transferring an intermediate image on the transfer member to a recording medium by bringing the intermediate image on the transfer member into contact with the recording medium;

a fine irregular layer forming means for forming an image having a fine irregular layer as an outermost layer by treating a surface of a region to which the first auxiliary liquid is applied of the intermediate image on the recording medium obtained by the transfer means to have convex portions having an average height in a range of 0.04 to 0.15 μm and an image definition C(2) of the image of 50% or more at an optical comb width of 2 mm; and a temperature adjustment means for adjusting the temperature of the intermediate image so that a temperature (Tc) of the intermediate image to be brought into contact with the recording medium is set to a temperature equivalent to or more than the glass transition temperature of the water-soluble resin, and a temperature (Tr) of the intermediate image to be peeled away from the transfer member is set to a temperature less than the glass transition temperature of the water-soluble resin.

33. The image recording apparatus according to claim 32, wherein the spherical particles are present in a thickness direction of the fine irregular layer.

* * * * *